(12) United States Patent
Schmidt Diaz et al.

(10) Patent No.: US 12,292,516 B2
(45) Date of Patent: May 6, 2025

(54) SYSTEM AND METHOD FOR GLOBAL NAVIGATION SATELLITE SYSTEM (GNSS) SPOOFING DETECTION

(71) Applicant: Board of Regents, The University of Texas System, Austin, TX (US)

(72) Inventors: Erick Schmidt Diaz, San Antonio, TX (US); David Akopian, San Antonio, TX (US); Nikolaos Gatsis, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 384 days.

(21) Appl. No.: 17/730,936

(22) Filed: Apr. 27, 2022

(65) Prior Publication Data
US 2022/0357460 A1 Nov. 10, 2022

Related U.S. Application Data

(60) Provisional application No. 63/180,312, filed on Apr. 27, 2021.

(51) Int. Cl.
*G01S 19/21* (2010.01)
(52) U.S. Cl.
CPC .................. *G01S 19/215* (2013.01)
(58) Field of Classification Search
CPC .................................................. G01S 19/215
See application file for complete search history.

(56) References Cited

U.S. PATENT DOCUMENTS

| | | | |
|---|---|---|---|
| 9,109,959 B2* | 8/2015 | Nieddu | G01K 7/24 |
| 11,874,382 B2* | 1/2024 | Odeh | H04K 3/90 |
| 2014/0247186 A1* | 9/2014 | Daneshmand | G01S 19/215 |
| | | | 342/357.59 |

(Continued)

OTHER PUBLICATIONS

Schmidt, Erick, Gatsis, Nikolaos, Akopian, David, "High-resolution Correlator Based Detection of GPS Spoofing Attacks Using the LASSO," 2020 IEEE/ION Position, Location and Navigation Symposium (PLANS), Portland, Oregon, Apr. 20-23, 2020, pp. 1196-1201. https://doi.org/10.1109/PLANS46316.2020.9109959 (Year: 2020).*

*Primary Examiner* — Marcus E Windrich
(74) *Attorney, Agent, or Firm* — Thomas | Horstemeyer, LLP

(57) ABSTRACT

A global navigation satellite system (GNSS) spoofing detection and classification technique is provided. An optimization problem is formulated at the baseband correlator domain by using an optimization algorithm such as the Least Absolute Shrinkage and Selection Operator (LASSO) algorithm, for example. A model of correlator tap outputs of the intended received signal is created to form a dictionary of pre-computed waveform functions (e.g., triangle-like-shaped functions). Sparse signal processing can be leveraged to choose a decomposition of pre-computed waveform functions from the dictionary. The optimal solution of this minimization problem can discriminate the presence of a potential spoofing attack peak by observing the decomposition of two different code-phase values (authentic and spoofed) in a sparse vector output. A threshold can be used to mitigate false alarms. Furthermore, a variation of the minimization problem can be provided that enhances the dictionary to a higher resolution.

19 Claims, 14 Drawing Sheets

(56) References Cited

U.S. PATENT DOCUMENTS

| | | | | |
|---|---|---|---|---|
| 2019/0154839 | A1* | 5/2019 | Ashjaee | G01S 19/28 |
| 2019/0204451 | A1* | 7/2019 | Boyer | G01S 19/36 |
| 2020/0371247 | A1* | 11/2020 | Marmet | G01S 19/015 |
| 2021/0263161 | A1* | 8/2021 | Broumandan | G01S 19/22 |
| 2021/0364644 | A1* | 11/2021 | Di Grazia | H04K 3/25 |
| 2022/0357460 | A1* | 11/2022 | Schmidt Diaz | G01S 19/215 |
| 2024/0430831 | A1* | 12/2024 | Jean | G01S 5/02216 |

\* cited by examiner

TABLE I
Synthetic Simulation Configuration Parameters

| Category | Parameter | Value |
|---|---|---|
| GPS signal | No. simulated peaks | 2 |
| | $f_s$ (MHz) | 25 |
| | Nominal CNR (dB) | 50 |
| | Authentic-over-spoofer power levels (dB) | 0 dB, 3 dB, 6 dB |
| | Coherent integration lengths (msec) | 1, 5, 10, 15, 20 |
| | $\theta_S$ | Neglected |
| | Frequency lock | Yes |
| | $\delta_{E-L}$ (chips) | 1.0 |
| Correlators | $d$ (chips) | 0.1 |
| | $F_p$ | 1, 5 |
| Dictionary matrix | $n$ (correlators) | 11 |
| | $p$ (code-phase delays) | 11, 55 |
| | $d_p$ | 0.1, 0.01 |
| Proposed technique | Threshold | 30% |
| | $\lambda$ | 0.3009 |

FIG. 7

SYSTEM AND METHOD FOR GLOBAL NAVIGATION SATELLITE SYSTEM (GNSS) SPOOFING DETECTION

CROSS REFERENCE TO RELATED APPLICATIONS

This application claims priority to, and the benefit of, co-pending U.S. provisional application entitled "System and Method for Global Navigation Satellite System (GNSS) Spoofing Detection" having Ser. No. 63/180,312, filed Apr. 27, 2021, which is hereby incorporated by reference in its entirety.

TECHNICAL FIELD

The present disclosure relates to systems and methods for detecting spoofing attacks on Global Navigation Satellite Systems (GNSSs).

BACKGROUND

GNSSs such as the Global Positioning System (GPS) provide crucial positioning and timing for applications in the civil, commercial, and military domains. Recently, GNSS receivers have grown in popularity due to their low costs and broad applications. Instances of GNSS uses can be seen in financial transactions, phase measurement units (PMUs) in power grids, and emergency services.

The open-access aspect of the GPS coarse acquisition (C/A) codes exposes the system to potential malicious attacks to position and timing-dependent applications. Such unintentional or intentional attempts are categorized as jamming and spoofing. While jamming attempts to disrupt or degrade GPS channels by signal blocking or overpowering, a smarter and more hazardous spoofing attack can imitate GPS signals aiming to mislead the target receiver and infringe flawed position and timing resolutions. The vulnerability to GNSS spoofing is an active research area due to its impact in critical and ever-growing GNSS-dependent applications.

Once the target receiver is deceived into locking to counterfeit signals, the typical spoofing attack shifts the authentic code and carrier phases to alter the position, velocity, and timing (PVT) solutions. Typically, commercial off-the-shelf (COTS) receivers lack ability to detect spoofing attacks. Additionally, recent software-defined radio (SDR) platforms have demonstrated fast-prototyping for spoofing attack implementation and mitigation techniques that otherwise commercial receivers lack. Literature has categorized the type of spoofing attacks into simplistic, intermediate, and advanced based on the complexity of the spoofing device, with intermediate spoofing being the most cost-effective in terms of implementation.

In recent literature, GNSS spoofing countermeasures have been categorized based on numerous aspects of proposed techniques and receiver implementation domain. FIG. 1 shows a categorization map of known GNSS countermeasure techniques. The countermeasure techniques shown in FIG. 1 fall into four main categories: (1) single-antenna advanced signal processing-based methods, (2) encryption-based methods, (3) drift monitoring methods, and (4) signal-geometry-based or multi-antenna methods. The single-antenna advanced signal processing-based methods rely on receiver tracking loops, correlator outputs, automatic gain control (AGC) power monitoring, and vector tracking loops (VTL). There are encryption-based signal authentication methods that are yet to be implemented in civilian GNSS signals. Drift monitoring methods identify unexpected variations in the positioning or timing solutions. Finally, signal-geometry-based or multi-antenna methods rely on estimating the angle-of-arrival or spatial vector between authentic and counterfeit signals. Spoofing countermeasures are also sometimes categorized into baseband domain—related to techniques pertaining to signal acquisition and tracking in the physical layer—and navigation domain such as receiver autonomous integrity measurement (RAIM). The baseband domain can be further sub-categorized into pre-correlator, correlator, and post-correlator domains.

In terms of spoofing countermeasure extent, the techniques can be classified into three independent categories: (a) detection, which can be also seen as a binary decision monitor usually based on scalar-valued output metrics; (b) classification, which discerns patterns in the received signal based on the nature of the technique, e.g., a MP delay profile, auxiliary peak tracking, or chip-level MP delays; and (c) mitigation, which provides correction or rejection of the attack. Also, these categories are considered independent such that, e.g., one countermeasure technique may feature detection, detection and mitigation, or all three.

While all of the existing GNSS spoofing countermeasure techniques are effective to an extent, a need still exists for GNSS spoofing countermeasure techniques that are more effective than the existing GNSS spoofing countermeasure techniques.

SUMMARY

The present disclosure relates to various embodiments of systems and methods for detecting a spoofing attack on a GNSS receiver. In accordance with an embodiment, the system comprises a memory device having a dictionary of pre-computed discrete-time waveforms stored therein and a processor configured to perform a spoofing detection algorithm that uses the dictionary of pre-computed discrete-time waveform functions to process an output signal of a correlator bank of the GNSS receiver to identify a sparse combination of components of the pre-computed discrete-time waveforms in the output signal of the correlator bank. The identified sparse combination of components corresponds to at least an intended received GNSS signal and a spoofing signal contained in the output signal of the correlator bank.

In accordance with a representative embodiment of the system, the output signal of the correlator bank comprises a discrete-time triangle-like-shaped function or a combination of discrete-time triangle-like-shaped functions, and the pre-computed discrete-time waveform functions are discrete-time triangle-like-shaped functions. In accordance with a representative embodiment of the system, the spoofing detection algorithm identifies the sparse combination by performing an sparse optimization algorithm that selects components of a sparse vector of the dictionary of pre-computed discrete-time triangular-like-shaped functions that best matches the code-phase of the output signal of the correlator bank.

In accordance with a representative embodiment of the system, the optimization algorithm comprises a Least Absolute Shrinkage and Selection Operator (LASSO) algorithm.

In accordance with a representative embodiment of the system, the selected components of the sparse vector include in-phase and quadrature components.

In accordance with a representative embodiment of the system, the optimization algorithm comprises a multi-LASSO algorithm.

In accordance with a representative embodiment of the system, the spoofing detection algorithm identifies at least first and second peaks of first and second discrete-time triangle-like-shaped functions, respectively, corresponding to the intended received GNSS signal and the spoofing signal, respectively. The spoofing detection algorithm includes a thresholding algorithm that applies a threshold value to magnitudes corresponding to the first and second peaks to reduce a possibility of false detection of the spoofing signal.

In accordance with a representative embodiment of the system, the selected components of the sparse vector correspond at least to the intended received GNSS signal, the spoofing signal and a multipath (MP) signal, and the spoofing detection algorithm distinguishes between the intended received GNSS signal, the spoofing signal and the MP signal.

In accordance with a representative embodiment of the system, the sparse optimization algorithm finds an optimal selection according to an approximation error of a cost function to select the components of the sparse vector of the dictionary of pre-computed discrete-time triangular-like-shaped functions.

In accordance with a representative embodiment of the system, the dictionary comprises sets of pre-computed triangle-like-shaped functions, each set corresponding to an expected triangle-like-shaped waveform of the output signal of the correlator bank that are discrete-time shifted relative to the expected triangle-like-shaped waveform of the output signal by predetermined discrete-time shift amounts.

In accordance with a representative embodiment of the method, the method comprises:
  performing a spoofing detection algorithm in a processor that:
    receives an output signal of a correlator bank of the GNSS receiver; and
    uses a dictionary of pre-computed discrete-time waveform functions to process the output signal of the correlator bank to identify a sparse combination of components of the pre-computed discrete-time waveforms in the output signal of the correlator bank; the identified sparse combination of components corresponding to at least an intended received GNSS signal and a spoofing signal contained in the output signal of the correlator bank, the a memory device, the dictionary of pre-computed discrete-time waveforms being stored in a memory device and read out by the processor.

In accordance with a representative embodiment of the method, the output signal of the correlator bank comprises a discrete-time triangle-like-shaped function or a combination of discrete-time triangle-like-shaped functions, and the pre-computed discrete-time waveform functions are discrete-time triangle-like-shaped functions. The spoofing detection algorithm identifies the sparse combination by performing an sparse optimization algorithm that selects components of a sparse vector of the dictionary of pre-computed discrete-time triangular functions that best matches the code-phase of the output signal of the correlator bank.

In accordance with a representative embodiment of the method, the optimization algorithm comprises a Least Absolute Shrinkage and Selection Operator (LASSO) algorithm.

In accordance with a representative embodiment of the method, the selected components of the sparse vector include in-phase and quadrature components.

In accordance with a representative embodiment of the method, the optimization algorithm comprises a multi-LASSO algorithm.

In accordance with a representative embodiment of the method, the spoofing detection algorithm identifies at least first and second peaks of first and second discrete-time triangle-like-shaped functions, respectively, corresponding to the intended received GNSS signal and the spoofing signal, respectively. The spoofing detection algorithm includes a thresholding algorithm that applies a threshold value to magnitudes corresponding to the first and second peaks to reduce a possibility of false detection of the spoofing signal.

In accordance with a representative embodiment of the method, the selected components of the sparse vector correspond at least to the intended received GNSS signal, the spoofing signal and an MP signal, and the spoofing detection algorithm distinguishes between the intended received GNSS signal, the spoofing signal and the MP signal.

In accordance with a representative embodiment of the method, the sparse optimization algorithm finds an optimal selection according to an approximation error of a cost function to select the components of the sparse vector of the dictionary of pre-computed discrete-time triangular-like-shaped functions.

In accordance with a representative embodiment of the method, the dictionary comprises sets of pre-computed triangle-like-shaped functions, each set corresponding to an expected triangle-like-shaped waveform of the output signal of the correlator bank that are discrete-time shifted relative to the expected triangle-like-shaped waveform of the output signal by predetermined discrete-time shift amounts.

For embodiments of the method that are implemented in software, the present disclosure also relates to computer program embodied on a computer-readable medium and comprising computer code for execution by a processor to detect a spoofing attack on a GNSS receiver. The computer program comprising a first code portion that receives an output signal of a correlator bank of the GNSS receiver and a second code portion that uses a dictionary of pre-computed discrete-time waveform functions to process the output signal of the correlator bank to identify a sparse combination of components of the pre-computed discrete-time waveforms in the output signal of the correlator bank. The identified sparse combination of components correspond to at least an intended received GNSS signal and a spoofing signal contained in the output signal of the correlator bank, the dictionary of pre-computed discrete-time waveforms being stored in a memory device and read out by the processor.

The method can also be implemented solely in hardware or in a combination of hardware and software and/or firmware.

These and other features and advantage will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 7 shows a table that lists the simulation parameters for signal generation, correlators' configuration, dictionary matrix sizes, and method for the next results.

DETAILED DESCRIPTION

Often, spoofing attacks can manifest as multipath (MP). In fact, considerable research addresses the discrimination between spoofing and MP. However, in accordance with inventive principles and concepts disclosed herein, it is observed that there are four overall main differences for a smart spoofer: (1) the delay profile of the authentic and spoofed signal combined appears to be sparse per channel, as opposed to MP signals, which appear as a cluster of reflected signals with various delays referred to as delay profile; (2) the spoofing attack occurs on many, if not all, visible channels concurrently; (3) the spoofed channels show a substantial delay incurred by the attack; and (4) such attacks can overall incur significantly more damage to the PVT solution, e.g., cause the user position and time estimates to deviate more substantially when compared to MP.

Figure 1:
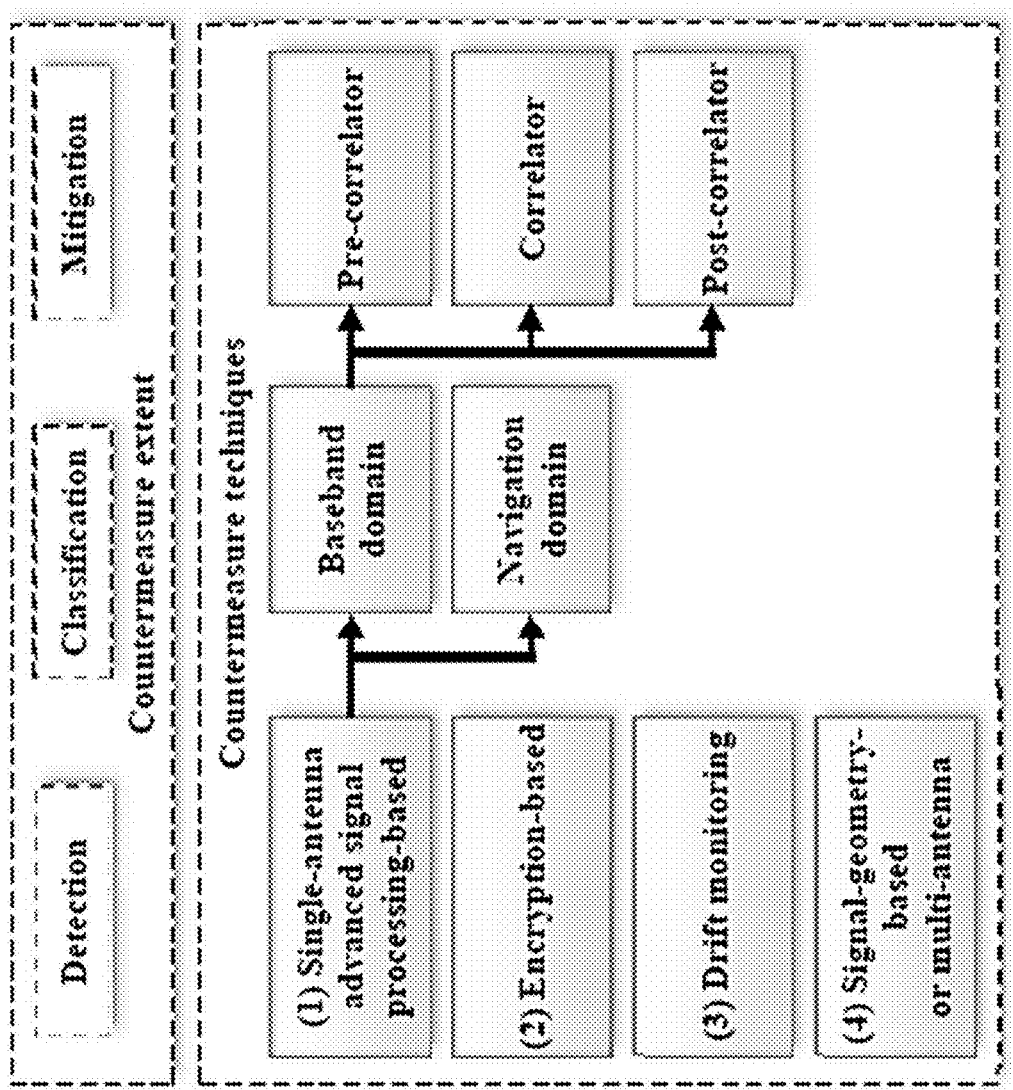
FIG. 1 is a diagram that shows a categorization map of known GNSS countermeasure techniques.

The methodology disclosed in the present disclosure can be viewed as falling into the baseband correlator domain shown in FIG. 1. This domain is important because it precedes navigation, where the damage to the PVT solution is by that time rendered. GNSS signals are commonly processed using a correlation-based synchronization of received signals with locally generated replicas of expected signal patterns. In particular, an ideal correlation profile of a GPS C/A signal resembles a triangle function, where the triangle elements correspond to the correlations of the received signal with replica fragments generated with various time delays. The triangle peak corresponds to the correlation with the aligned replica. Spoofing signals distort the triangle profile and complicate the synchronization process, as the correlation profile becomes a superposition of several such triangles of unknown intensity. In addition, such distortions can be mixed with residual uncompensated sinusoidal modulations due to Doppler effects.

The present disclosure provides an automatic method for triangle-based decomposition of the correlation profiles and extraction of contributing individual components, resulting from both desired and spoofing signals. In accordance with a representative embodiment, the decomposition exploits an optimization problem modeling the Least Absolute Shrinkage and Selection Operator (LASSO). Then, the decomposition helps to discriminate desired and spoofing components via a sparse output. The correlation profile of the received signal can be categorized using a dictionary of shifted triangle shapes and a sparse vector to select potential shifted triangles from the dictionary. The optimal solution of this minimization technique discerns the presence of a spoofing attack by observing two different code-phase values, i.e., authentic and spoofed peaks, in the sparse vector. In addition, preferably a threshold (TH) value is used to mitigate false alarms.

Moreover, in accordance with a representative embodiment, a variation of the minimization problem is performed to enhance the dictionary to a higher resolution of shifted triangles. Specifically, the higher resolution aspect improves the detection capability (sensitivity) such that a peak appearing between two discrete code-phase sampling points is still detected, while the correlator bank configuration can remain unchanged.

In accordance with a representative embodiment, the signal processing algorithm of the technique disclosed herein relies on discerning two steps occurring in the tracking loops: (1) correlation and integration, or so-called integrate-and-dump filter; and (2) tracking loop discriminators and feedback filters. The correlator bank taps are analyzed after carrier wipe-off and before entering the discriminators and feedback loop filters. The method detects a spoofing event and discriminates when two peaks are present.

Additionally, the technique disclosed herein can be implemented as a replacement module for conventional GPS receivers or as a baseband advanced fine-acquisition monitoring tool that can be deployed based on alarm-threshold strategies, or on scheduled or other arbitrary times. Further, by discerning between authentic and counterfeit peaks, the tracking loops can intelligently decide to follow the authentic peak without additional complex modifications. As long as the COTS receiver provides correlator bank tap outputs, the proposed monitoring tool can potentially be coupled with additional algorithms such as auxiliary peak tracking, or advanced navigation-level spoofer-detectors.

In accordance with a preferred embodiment, the system and method employ the following:
(1) spoofing is modelled as a characteristic sparse event, i.e., spoofing peaks appear discretely, and thus can be addressed via sparse techniques;
(2) the LASSO technique is used as an optimization technique for automatic peak discrimination;
(3) a high-resolution aspect is introduced to the discrimination process; and
(4) a multi-LASSO optimization technique is used to enhance the discrimination of spoofer peaks that appear between two discrete code-phase sampling points.

Without losing generality, the GPS C/A code signal is used throughout the present disclosure, but it will be understood that the method and system can be extended to other GNSS signals.

In the following detailed description, a few illustrative, or representative, embodiments are described to demonstrate the inventive principles and concepts. For purposes of explanation and not limitation, representative embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing logic," as those terms are used herein, encompass an electronic component that is able to execute a computer program, portions of a computer program or computer instructions. References herein to a computer comprising "a processor" should be interpreted as a computer having one or more processors or processing cores. The processor may, for instance, be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Figure 2:
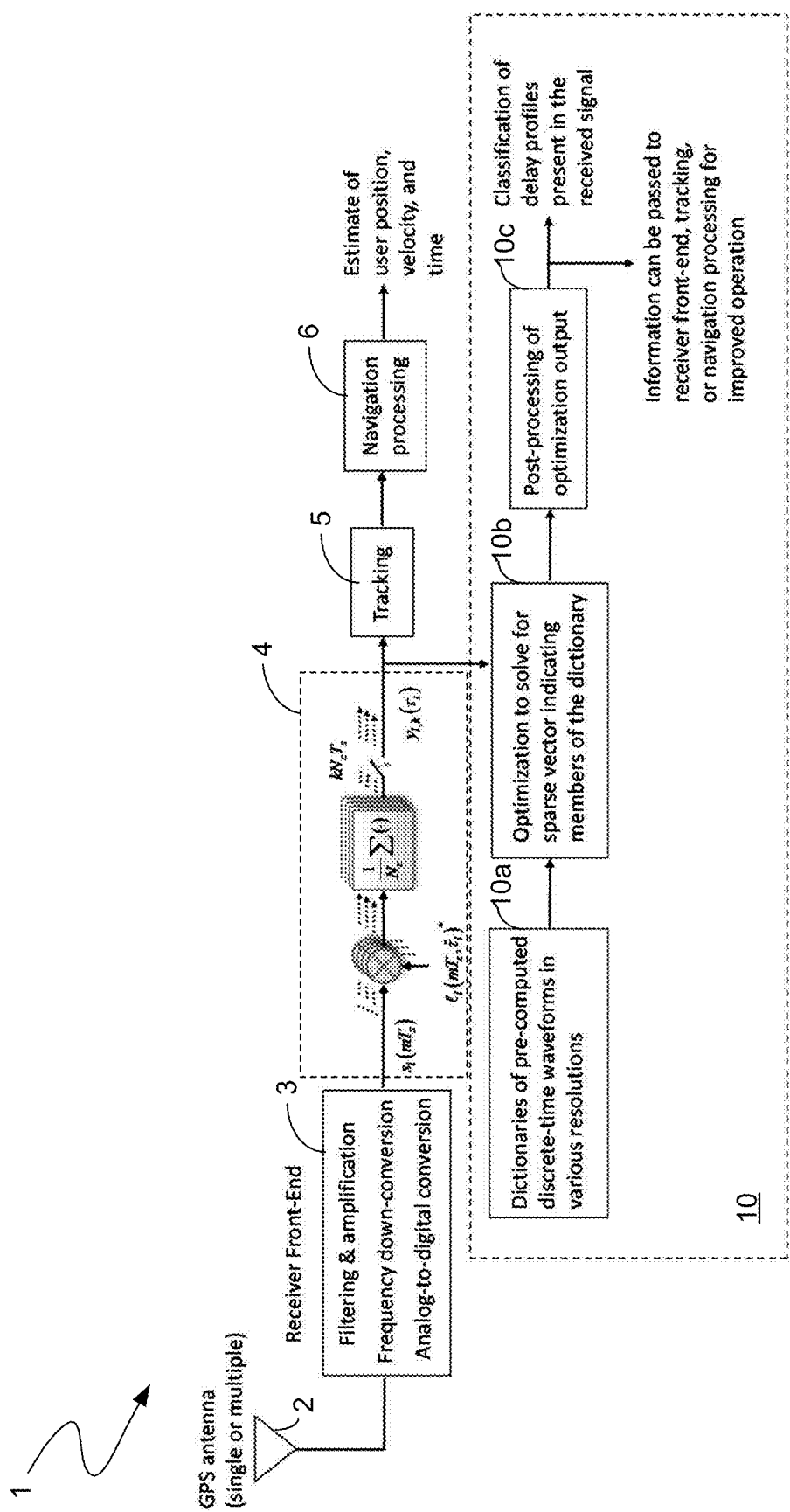
FIG. 2 is a block diagram of a GPS receiver in accordance with a representative embodiment that implements the system and methodology of the present disclosure.

FIG. 2 is a block diagram of a GPS receiver 1 that implements the system 10 and methodology of the present disclosure. A GPS antenna 2 of the GPS receiver 1 receives GPS signals transmitted over a GPS network. A GPS receiver front-end 3 performs typical GPS receiver front-end algorithms such as, signal filtering and amplification, frequency down-conversion and analog-to-digital conversion (ADC). Block 4 represents the bank of correlators of the GPS receiver 1 that performs a known correlation algorithm to detect the intended received GPS signal by correlating the received GPS signal with a plurality of expected received GPS signals. Block 5 represents a typical post-correlation tracking algorithm that is performed by a phase-lock loop (PLL) and a delay-lock loop (DLL) of the GPS receiver 1 to track carrier-phase alignments and code-phase alignments. The term "post-correlation tracking" is used in this context to differentiate that tracking from the tracking algorithms that are typically performed in the correlation bank 4. Block 6 represents typical navigation processing logic for processing the tracked GPS signal to obtain the PVT solution. Block 10 represents the system that performs the method of the present disclosure.

It should be noted that a GPS can include multiple instances of the GPS receiver 1 shown in FIG. 2. Additionally, each GPS receiver 1 typically contains multiple instances of the channel represented by blocks 3-6.

The overall function of a GPS receiver is to maintain continuous synchronization with visible satellite signals for range measurements, ephemeris data extraction, and PVT estimation. This synchronization is achieved in two steps: (coarse) acquisition to find visible satellite signals and (fine) tracking for regular operation [33].

Conventional GPS receivers use the tracking loops (block 5) for joint fine-tuning of the incoming signal to residual Doppler carrier frequency and phase offsets, and spreading code alignment. The PLL tracks carrier-phase alignments and the DLL tracks code-phase alignments. Both loops achieve this by generating local carrier and code replicas, respectively. Discriminators and filters for both the PLL and DLL are used afterwards as feedback loops. An initial estimation of a number of received spreading code chips against the locally generated code replica is commonly called a code-phase. A set of correlators in the DLL compare several phase-shifted copies of the local code replica with the incoming signal for code-phase adjustments. COTS GPS receivers typically employ three shifts to find the peak of the correlators, namely, early, prompt, and late (EPL) correlators; however, advanced receivers with higher resolution in code-phase tracking loops are reported with hundred or more correlator banks. The correlator spacing is typically within a 1-chip period. This allows code-phase synchronization with at least one replica with sub-chip accuracy.

A GPS signal seen at the receiver front-end 3 is composed of an ensemble of satellite signals (channels) and their corresponding interference plus noise. Without loss of generality, the complex-valued baseband received signal for a single GPS channel, l, can be modeled after RF down conversion as follows:

$$s_l(mT_s) = \sqrt{\rho_l} b_l(mT_s - \tau_l) c_l(mT_s - \tau_l) e^{j\theta_l} + \eta(mT_s) \quad (1)$$

where m is the discrete sample index, $T_s$ is the sampling period, $\rho_l$ is the received channel power, $b_l$ is the modulated bit, $c_l$ is the C/A spreading code, $\eta(mT_s)$ is the complex-valued AWGN random process with variance $\sigma_{FE}^2$, and $\tau_l$ and $\theta_l$ are the code and carrier phase parameters, respectively, which are in general time-varying. Residual frequencies components such as intermediate frequency and Doppler effects have been omitted for simplicity. Equation 1 represents the output signal of block 3 and the input signal to the correlator bank 4. The receiver 1 generates local carrier-phase and code-phase replicas:

$$l_l(mT_s, \hat{\tau}_l) = c_l(mT_s - \hat{\tau}_l) e^{j\hat{\theta}_l} \quad (2)$$

where $\hat{\tau}_l$ and $\hat{\theta}_l$ are the estimated parameters for the l-th synchronized channel. In the correlator bank 4, the replicas represented by Equation 2 are multiplied by the input signal to the correlator represented by Equation 1 to produce the complex-valued accumulation product for the k-th coherent integration for a correlator:

$$x_{l,k} = x_l(kN_cT_s) = \frac{1}{N_c} \sum_{m=kN_c}^{(k+1)N_c - 1} s_l(mT_s) l_l(mT_s, \tau_l)^* \quad (3)$$

where $N_c = f_s T$ is the number of samples of the coherent integration period T, $f_s = 1/T_s$ is the sampling frequency, $(\bullet)^*$ is the complex conjugate operator, and the k-th coherent integration length is $kN_cT_s$, $k \in \{0, 1, \ldots\}$.

Considering multiple shifted code replicas (or correlator taps) in each channel based on the receiver hardware configuration, a post-correlation model for the l-th channel and the k-th coherent integration can be written as a function of an (arbitrary) discrete lag $\tau_i$ for the i-th correlator tap:

$$y_{l,k}(\tau_i) = \sqrt{\rho_{l,k}} R(\Delta \tau_i) e^{j\Delta\theta_{l,k}} + \eta_{l,k} \quad (4)$$

where $R(\bullet)$ is the autocorrelation function depicted as a triangle or peak, $\Delta\tau_i = \tau_{l,k} - \tau_i$, $\Delta\theta_{l,k} = \theta_{l,k} - \hat{\theta}_{l,k}$, and $\eta_{l,k}$ is the coherent accumulation of residual cross-correlation terms and AWGN. We define the discrete lag as $\tau_i = \hat{\tau}_{l,k} - \delta_i$, where $\hat{\tau}_{l,k}$ is the estimated code-phase value, $\delta_i = (i-1)d - \delta_{E-L}/2$, $i \in \{1, \ldots, n\}$, is a code delay where d is the correlator spacing in chips, $\delta_{E-L}$ is defined by the spacing between the earliest and latest correlators, $\delta_{E-L} \geq d$, and $n = \delta_{E-L}/d + 1$ is a fixed number of correlators in the receiver. Equation 4 represents the intended received GPS signal that is output from the correlator bank 4 the tracking block 6. As an example, a typical EPL tracking loop system uses $\delta_{E-L} = 1.0$, d=0.5, and n=3; a narrow correlator uses $\delta_{E-L} = 0.1$, d=0.05, and n=3. Additionally, the modulated bit has been omitted in (4) for simplicity.

The correlator block 3 shown in FIG. 2, can be expanded to in-phase and quadrature components of the complex-valued signals, namely $s_l^I(mT_s)$ and $s_l^Q(mT_s)$, as well as for the n phase-shifted correlators; otherwise, signals are considered complex-valued.

Spoofer Description

Knowing the exact position of the target receiver antenna and/or having physical access to it (e.g., PMUs) allows intermediate spoofers to carry out a so-called coherent superposition attack. It consists of synthesizing and conveying a GPS-like signal to replicate authentic carrier-phase, code-phase, and data bits, to centimeter-level accuracy for each visible open-access channel. Afterwards, the spoofer gradually increases its power so that the receiver locks to a fake correlation peak. Finally, the spoofer deliberately drags-off the correlation peak to perpetrate a PVT deviation, while maintaining lock during the attack.

Without the loss of generality and from this point onward, channel index 1 and coherent integration instance k are omitted. The post-correlation model, e.g., the output of the correlator bank 4, for a single channel and integration instance under a spoofing attack now includes additional terms:

$$y(\tau_i) = y_A(\tau_i) + y_S(\tau_i) + \tilde{\eta} \quad (5)$$
$$= \sqrt{\rho_A} R(\Delta\tau_i) e^{j\Delta\theta} +$$
$$\sqrt{\rho_S} R(\tau_S - \tau_i) e^{j(\theta_S - \hat{\theta})} + \tilde{\eta}$$

where $\rho_A$ and $\rho_S$ are the authentic and spoofer powers, respectively; $\tau_S$ and $\theta_S$ are the spoofer signal code-phase and carrier-phase, respectively, and $\tilde{\eta}$ now includes additional cross-correlation terms from the spoofer. An important assumption on the spoofer model for this study is a so-called frequency locked attack, where both the authentic and spoofer are presumed to have the same residual Doppler frequency during the attack, and thus is neglected in Equation 5 and onwards. Otherwise, a sinusoid fluctuation on the spoofer peak would be observed for different k integrations that could either increase, degrade, or not affect the authentic peak.

Figure 3:
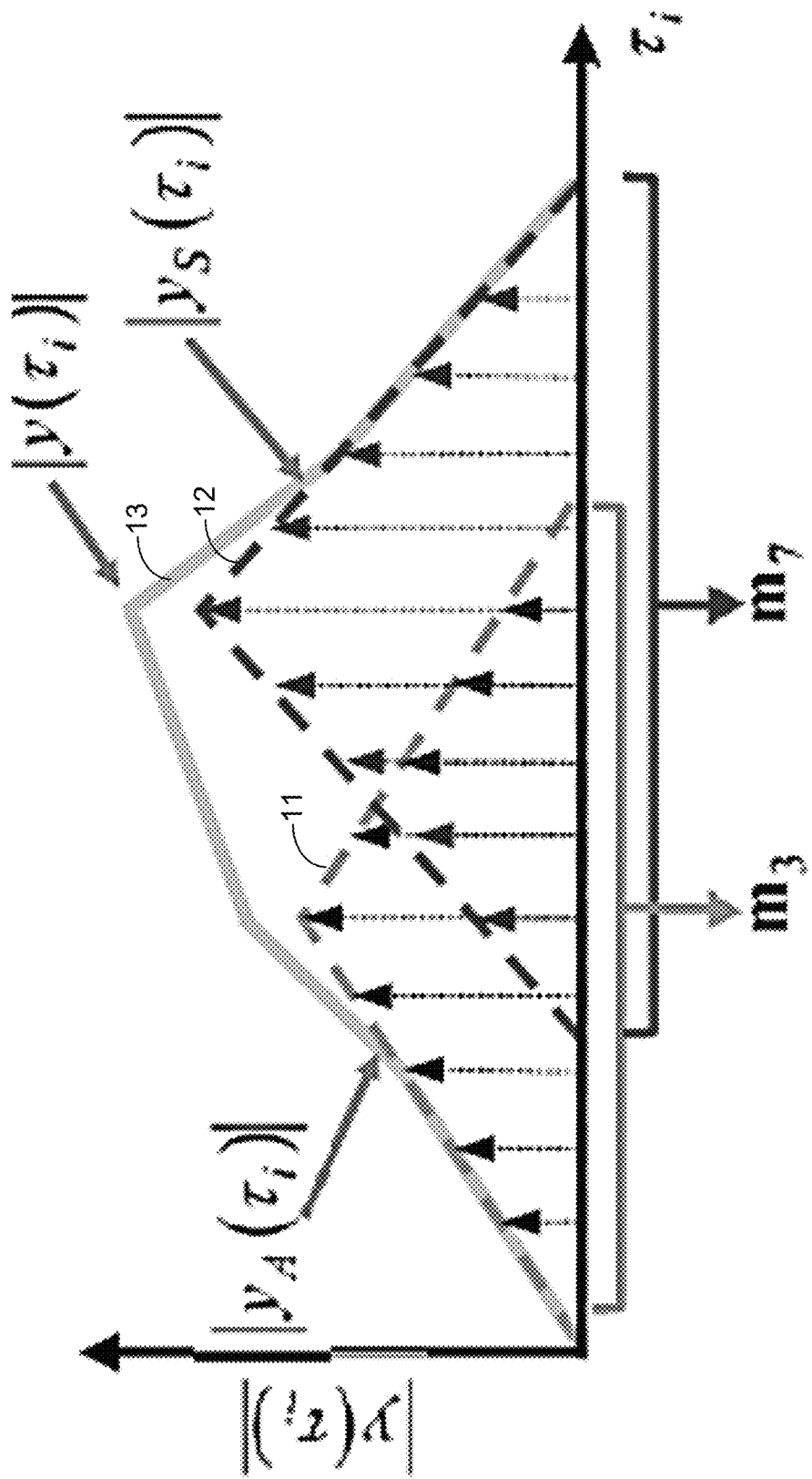
FIG. 3 depicts the magnitude of the output of the correlator bank show in FIG. 2 during a spoofing attack as two superimposed triangle shapes, or correlation peaks, with aligned phases.

FIG. 3 depicts the magnitude of the output of the correlator bank 4 during a spoofing attack as two superimposed triangle shapes, or correlation peaks, with aligned phases. The triangle 11 describes the authentic peak resulting of a typical correlator output. The triangle 12 describes the spoofing peak. The more correlator taps that are used, the finer the resolution that is seen in this triangle-like-shaped output. The curve 13 describes the signal that is output from the correlator bank 4 during the spoofing attack.

The following describes the method performed by the system 10 shown in FIG. 2 in accordance with a representative embodiment.

Dictionary Construction and LASSO-Based Authentication

First, the problem formulation will be described by assuming real-valued terms initially. Then, the problem formulation will be expanded to a comprehensive complex domain.

Assuming a two-stage correlation process is performed by the correlator bank 4 (before tracking loops) where carrier wipe-off occurs first, and code sample-wise multiplication and integration follows, a bank of local codes typically stored in the receiver's non-volatile memory is postulated. In the following, such bank of replicas is expressed in a matrix form using n discrete replicas with consecutive code-phases:

$$C = [c_1, \ldots, c_i, \ldots, c_n]^T \quad (6)$$

where $C \in \mathbb{R}^{n \times N_c}$, $c_i = [c(mT_s - \tau_i)], m \in \{1, \ldots, N_c\}$ is the i-th single-period shifted local code replica in column-vector format; and $\tau_i = \hat{\tau} = \delta_i$. This set of replicas will be used to assess the alignment of individual received signals.

Similarly, a high-resolution set of normalized and noise-less signals with p discrete code-phases, and disregarded Doppler effects is defined as:

$$S=[s_1, \ldots, s_j, \ldots, s_p] \quad (7)$$

where $S \in \mathbb{R}^{N_c \times p}$, and $s_j=[c(mT_s-\tau_j)], m \in \{1, \ldots, N_c\}$ is also a single-period local code replica, in column-vector format; and $\tau_j=\hat{\tau}-\gamma_j$ is the signal delay. The term high-resolution develops from a finer-granularity of code-phases between consecutive $s_j$ signals. The signals $s_j$ are introduced to represent ideal received signals of various delays. The received signal delays might not exactly match the set of discrete delays represented by $c_i$ due to channel-induced random delays, which requires additional attention. Thus the higher resolution code-phases are defined for the received signals by the delay $\gamma_j=(j-1-\lfloor F_p/2 \rfloor)d/F_p-\delta_{E-L}/2$, $j \in \{1, \ldots p\}$, along with a finer signal spacing $d_p=d/F_p$. For both code-phase and signal spacing, $F_p$ is called p-factor and defines the high-resolution factor between n correlator taps and p shifted code signals, i.e., $p=nF_p$. In particular, $p=n$ for $F_p=1$ will correspond to the same delay grid of both received and replica signals.

Figure 4:
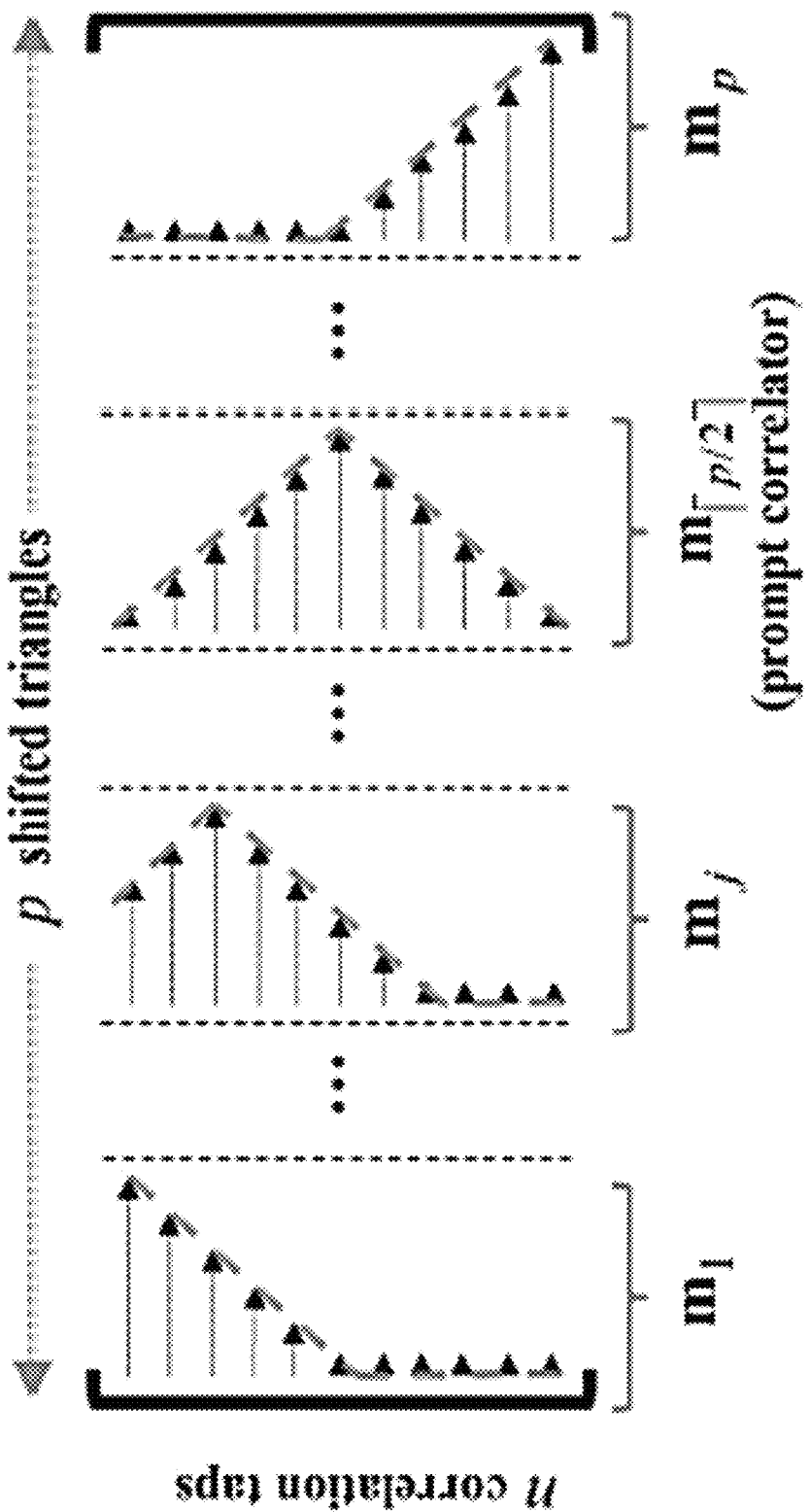
FIG. 4 shows a visual representation of matrix M of n correlation taps and p shifted triangles of the dictionary used by the method and system in accordance with an embodiment.

Finally, a normalized real-valued dictionary of triangle replicas is defined by correlating p high-resolution code shifted signals with a bank of n replicas:

$$M=CS=[m_1, \ldots, m_j, \ldots, m_p] \quad (8)$$

where $M \in \mathbb{R}^{n \times p}$ is the dictionary of correlations of ideal received signals (with p possible code-phases) with local replica signals (with n possible code-phases). In other words, the code-phase grid of the received signals is $F_p$ times finer than the code-phase grid of replicas. Here, $m_j=Cs_j$ is a triangle shape correlation output of a single-period local code signal, with delay $\tau_j$, with the bank of local replicas C. FIG. 4 shows a visual representation of matrix M of n correlation taps and p shifted triangles.

With the defined dictionary matrix, the post-correlation signal can be modeled as follows:

$$\underbrace{\begin{pmatrix} y_1 \\ \vdots \\ y_n \end{pmatrix}}_{y} = \underbrace{\begin{pmatrix} m_{1,1} & \cdots & m_{1,p} \\ \vdots & \cdots & \vdots \\ m_{n,1} & \cdots & m_{n,p} \end{pmatrix}}_{M} \underbrace{\begin{pmatrix} \beta_1 \\ \vdots \\ \beta_p \end{pmatrix}}_{\beta} + \eta \quad (9)$$

where $y \in \mathbb{R}^{n \times 1}$ is the received l-th channel, k-th coherent integration (omitted) post-correlation model after carrier wipe-off, $y_i=y(\tau_i)=\sqrt{\bar{\rho}}R(\Delta\tau_i)\cos \Delta\theta+\eta, i \in \{1, \ldots, n\}$ is the i-th correlation tap output; $m_{i,j} \in \mathbb{R}^{n \times p}$ is the i-th correlation tap for the j-th signal shift, i.e., $$m_{i,j} = R(\tau_j - \tau_i), \text{ and } \beta \in \square^{p \times 1}, \quad (10)$$

$$\hat{\beta} = \underset{\beta}{\operatorname{argmin}} \left\{ \frac{1}{2} \|y - MB\|_2^2 + \lambda \|\beta\|_1 \right\}$$

where $\lambda$ is a tuning parameter that controls the amount of regularization of the sparse solution. The first component in the objective function in Equation 10 attempts to select columns of the dictionary matrix to match the received signal, while the second term encourages a sparse solution. In a successful detection of a spoofer attack, two non-zero entries in the selector $\hat{\beta}$ are expected, e.g., $\hat{\beta}_3$ and $\hat{\beta}_7$ (see FIG. 3 for reference). It is worth noting that Equation 10 can be reformulated into a small-to-moderate sized convex quadratic program, which can be efficiently and reliably solved. Additionally, $\ell_2$-norm regularizations were explored in Equation 10, but $\ell_1$-norm showed superior robustness because it promotes sparsity.

In-Phase and Quadrature LASSO

In a more comprehensive problem formulation and similar to common GPS receiver tracking loops, the case for $y \in \mathbb{C}^{n \times 1}$ to account for spoofer peak carrier-phase rotations and complex-valued AWGN is examined. The received post-correlation vector is split into its in-phase and quadrature components:

$$y=y^I+iy^Q$$

$$y_i^I=y^I(\tau_i)=\sqrt{\bar{\rho}}R(\Delta\tau_i)\cos \Delta\theta+\eta^I$$

$$y_i^Q=y^Q(\tau_i)=\sqrt{\bar{\rho}}R(\Delta\tau_i)\sin \Delta\theta+\eta^Q \quad (11)$$

Similarly, the selector output is split, i.e., $\beta=\beta^I+i\beta^Q$. The objective function in Equation 10 is expanded to solve for both in-phase and quadrature components, either jointly or separately:

$$\left(\hat{\beta}^I, \hat{\beta}^Q\right) = \underset{\beta^I, \beta^Q}{\operatorname{argmin}} \left\{ \begin{array}{l} \frac{1}{2}\|y^I - M\beta^I\|_2^2 + \lambda\|\beta^I\| + \\ \frac{1}{2}\|y^Q - M\beta^Q\|_2^2 + \lambda\|\beta^Q\| \end{array} \right\} \quad (12)$$

Finally, the magnitude of both in-phase and quadrature outputs is obtained as:

$$|\hat{\beta}|=|\hat{\beta}^I+j\hat{\beta}^Q| \quad (13)$$

From this point onwards, the next sections will assess the proposed spoofer detection method by using the magnitude of $\hat{\beta}$, as in Equation 13.

The Multi-LASSO Technique

For a fixed set of correlator taps in a GPS receiver, the proposed method is able to detect peaks in a discrete grid. This restriction occurs when $F_p=1$, and thus $p=n$. For example, if $\delta_{E-L}=1.0$, $d=0.1$, and $F_p=1$, the discrete grid for detection is:

$$\delta=[-0.5, -0.4, \ldots, 0.0, 0.1, \ldots, 0.5]^T. \quad (14)$$

If a detected peak's code-phase does not fall on this grid, e.g., at 0.04, a peak-splitting occurrence is observed, as the peak falls between correlator taps 0.0 and 0.1. This can cause energy being split between two coefficients in $\hat{\beta}$ and potentially incite a miss-detection based on a threshold level.

Based on this motivation, an attempt is made to overcome the peak-splitting phenomena by increasing the grid resolution by setting $F_p>1$ and $p>n$. As mentioned above, the high-resolution p-factor defines a finer signal spacing in the p-domain of the dictionary matrix, as opposed to a fixed bank of n replicas coming from the configuration of the receiver. Overall, the p-factor increases the number of possible shifted triangle columns. These shifted triangles are correlation combinations of code replicas and signals, with code phases $\delta_i, i \in \{1, \ldots, n\}$, and $\gamma_j$, $j \in \{1, \ldots, p\}$, respectively. Additionally, the n correlators require no modification in the receiver, i.e., it can be seen as an artificial increase in grid resolution. To achieve this, we propose a method for the $p>n$ case to match the artificially generated high-resolution shifts to n receiver correlator taps. Following the example in (14), setting $F_p=5$ artificially increases the resolution from $d=0.1$ to $d_p=0.02$. Now, additional peak code phases of [−0.04, −0.02, 0.0, 0.02, 0.04] are found on the detection grid around the prompt correlator tap 0.0.

The multi-LASSO formulation is commenced by generating a single high-resolution dictionary matrix M by setting $F_p > 1$ and p>n. The fat matrix is then split into $F_p$ individual square n×n matrices; this, to match the n correlator taps of the receiver. Each decimated matrix is built by de-interleaving the columns of the original fat matrix as follows (where MATLAB notation is used):

$$M_K = m(K:F_p:\text{end}), K \in \{1, \ldots, F_p\}. \quad (15)$$

For example, a dictionary matrix with $\delta_{E-L} = 1.0$, d=0.1, n=11, and $F_p = 5$, has size 11×55. Five individual 11×11 matrices are built from said matrix by taking columns [1, 6, 11, ..., 51] for $M_1$, [2, 7, 12, ..., 52] for $M_2$, etc. Each individual dictionary matrix can be seen as a delayed version of a square matrix for $F_p = 1$ and n=p, delayed by $d_p$. A multi-LASSO technique is then implemented by adjusting Equation 12 to include each $M_K$ jointly in the $\ell$-minimization function as follows:

$$\left(\hat{\beta}_{K=1\ldots F_p}^I, \hat{\beta}_{K=1\ldots F_p}^Q\right) = \underset{\beta_{K=1\ldots F_p}^I, \beta_{K=1\ldots F_p}^Q}{\arg\min} \begin{Bmatrix} \frac{1}{2}\sum_{K=1}^{F_p}\|y^I - M_K\beta_K^I\|_2^2 + \sum_{K=1}^{F_p}\lambda_K\|\beta_K^I\|_1 + \\ \frac{1}{2}\sum_{K=1}^{F_p}\|y^Q - M_K\beta_K^Q\|_2^2 + \sum_{K=1}^{F_p}\lambda_K\|\beta^{Q_K}\|_1 \end{Bmatrix} \quad (16)$$

Similar to Equation 12, each of the in-phase and quadrature outputs are combined to obtain $\hat{\beta}_K$, $K \in \{1, \ldots, F_p\}$ magnitudes. Moreover, since each vector is of size n, their entries can be directly matched to the receiver correlator taps. Specifically, the maximum output among all $\hat{\beta}_K$ outputs for the i-th correlator tap are chosen:

$$\hat{\beta}_{i,max} = \underset{\hat{\beta}_{K=1\ldots F_p,i}}{\arg\max} \left\{\hat{\beta}_{1,i}, \ldots, \hat{\beta}_{K,i}, \ldots, \hat{\beta}_{F_p,i}\right\} \quad (17)$$

After finding the maximum peak for taps $i \in \{1, \ldots, n\}$ from all $\hat{\beta}_K$ vectors, $\hat{\beta} n \times 1_{max}$ is obtained. The optimization technique deals with individual square matrices of size n×n per LASSO computation, thus making the solution numerically more robust. Additionally, the objective function can be computed individually and not necessarily jointly, but simulations performed show that joint computation is faster.

Peak-Sensitivity Response

To assess the sensitivity of our optimization technique for different configurations, that is, different p-factors, a similar concept of the impulse response in a low-pass filter can be utilized, referred to hereinafter as peak-sensitivity response (PSR). First, a synthetic signal is generated with authentic and spoofer peaks as the input:

$$y_{A_j,S_j} = C(\sqrt{\rho_A}s_{A_j} + \sqrt{\rho_S}s_{S_j} + \sqrt{\rho_\eta}\eta) \quad (18)$$

where $A_j$ and $S_j$ for $j \in \{1, \ldots, p\}$ are indices corresponding to the authentic and spoofed signals selected from matrix s in (7), $\rho_A$ and $\rho_S$ are the respective power levels, and $\eta$ is complex-valued noise with power level $\rho_\eta$. Additionally, the spoofer phase is neglected. Equation 18 is used as input to the method described herein and a single correlator tap is evaluated, e.g., $\hat{\beta}(0.3)$ for code-phase 0.3, as the output response. A spoofer peak is "swung" with fixed nominal carrier-to-noise ratio (CNR) through a high-granularity grid, i.e., $s_{S_j}, j \in \{1, \ldots, p\}$, as a stimulus (or impulse) to generate the PSR plot for said correlator tap index. Next, the authentic peak is fixed at the center, i.e., $s_{A_j,j} = \lceil p/2 \rceil$. The PSR of our system is assessed with the following configuration: $\delta_{E-L} = 1.0$, d=0.1, n=11, $f_s = 25$ MHz, and an authentic-over-spoofer power of 0 dB. This implies a power-matching scenario. A granularity of $d_p = 0.01$ chip is used for the grid of code-phases and a strong signal with CNR of 50 dB-Hz and 20 msec coherent integration length is simulated to test sensitivity in nominal conditions [1].

Figure 5:
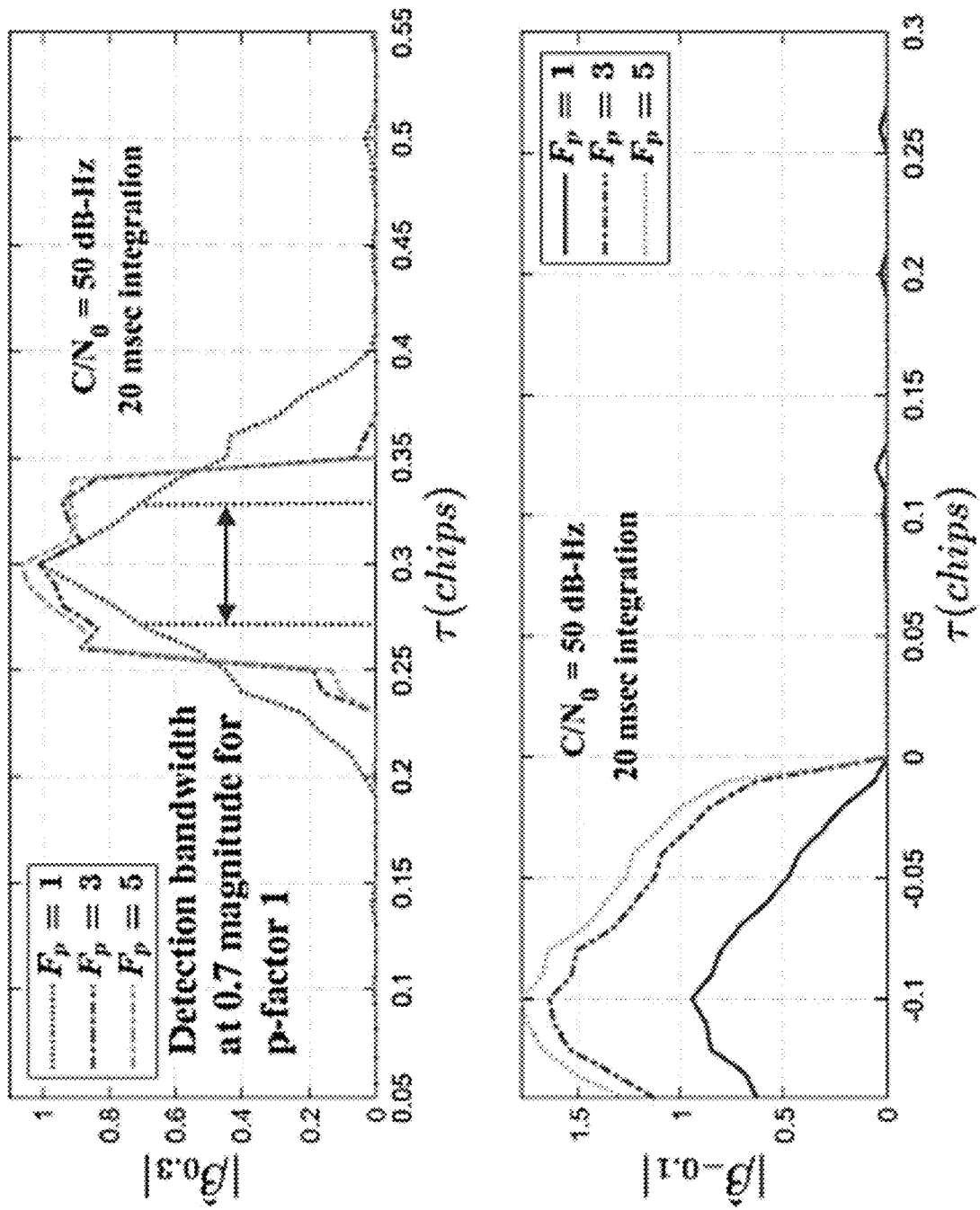
FIG. 5 is a PSR plot for proposed technique for spoofer peak sensitivity with p-factor $F_P$ of 1, 3, and 5 with the technique described by Equation 12, and the multi-LASSO technique described by Equation 16 for the correlator tap 0.3 (top) and tap −0.1 (bottom).

FIG. 5 is a PSR plot for proposed technique for spoofer peak sensitivity with p-factor $F_p$ of 1, 3, and 5 with the technique described by Equation 12, and the multi-LASSO technique described by Equation 16 for the correlator tap 0.3 (top) and tap −0.1 (bottom). The y-axis corresponds to the magnitude of the output as in (13), and the x-axis is the simulated spoofer delay, $\tau_j$. Similar to a discrete Fourier transform analysis, we evaluate a detection bandwidth from the PSR plot by observing the output of the optimization technique at the fixed correlator tap, i.e., $\hat{\beta}(0.3)$. On the top curve, the observed detection bandwidth for $F_p = 1$ at magnitude 0.7 is approximately 0.05. This translates to a sensitivity gap between neighbor correlator taps. On the other hand, a steeper curve and improved detection bandwidth is observed for $F_p > 1$ methods. This bandwidth corresponds to the size of the correlator spacing d and translates to almost non-existent sensitivity gaps due to the increased granularity. Similar to an impulse response through a low-pass filter, the detection bandwidth becomes flatter and the PSR response achieves a steeper slope (roll-off factor) for $F_p > 1$.

Similarly, the bottom graph of FIG. 5 shows the PSR at $\hat{\beta}(-0.1)$, where the observed correlator tap is next to the authentic peak tap at 0.0. For the case of $F_p = 5$, a sensitivity of up to −0.02 code-phase at a magnitude of 0.7 is discernible from the detection bandwidth before reaching the 0.0 tap. This translates to a potential decomposition of the spoofer peak as close as 0.02 chips to the authentic peak, with this configuration. Additionally, a magnitude increase is observed at the output of $\hat{\beta}(-0.1)$ (bottom of FIG. 5) from the LASSO numerical outputs. This is due to a potential energy absorption between both peaks and actually aids in the sensitivity for $F_p > 1$ near the prompt tap.

Simulations and Results

In this section, a comprehensive set of tests are performed that verify the model in Equations 12 and 16 for detection of a spoofer attack in the received post-correlation vector y. The model is tested on two different scenarios: synthetic generated GPS-like signals, and a real dataset. For both scenarios, we assess the selector output for two dictionary matrices: (1) p=n, for single-LASSO; and (2) p>n, for multi-LASSO.

The optimization technique is evaluated using the MATLAB-based convex-optimization solver CVX [37] along with synthetic data. Standard cross-validation (CV) methods are used to tune the parameter $\lambda$ for the simulations.

First, a synthetic simulation is presented to demonstrate the advantage of using a p-factor greater than one. Then, a series of Monte Carlo simulations are run to characterize the DER in various scenarios. Additionally, the effects of coherent integration length are assessed for enhanced CNR. To discern between noisy peaks and the authentic and spoofer peak locations, simulations are run to evaluate the PFA. Finally, the developed model is tested on data from the Texas Spoofing Test Battery (TEXBAT).

A Synthetic Simulation for Multi-LASSO

Figure 6:
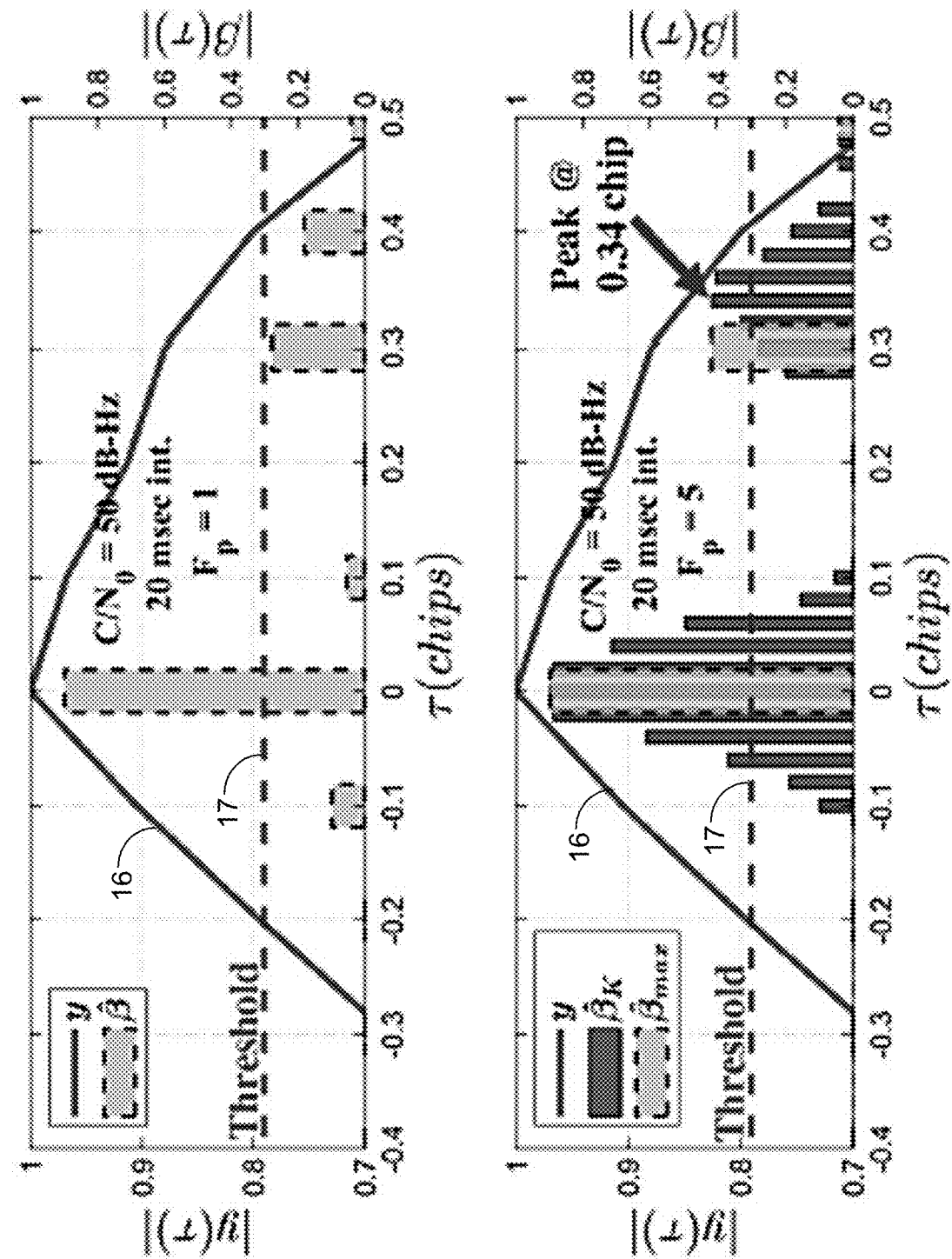
FIG. 6 shows the normalized received post-correlation vector y with simulated code-phase of 0.34, and CNR of 50 dB-Hz with p-factor of 1 (top), vs multi-LASSO output with p-factor of 5 (bottom) for a synthetic simulation of a received signal by using Equation 18.

The evaluation begins with a visual instance. FIG. 6 shows the normalized received post-correlation vector y with simulated code-phase of 0.34, and CNR of 50 dB-Hz with p-factor of 1 (top), vs multi-LASSO output with p-factor of 5 (bottom) for a synthetic simulation of a received signal by using Equation 18. An authentic peak with code-phase of 0.0, and a spoofer peak at 3 dB authentic-over-spoofer power with a code-phase of 0.34 are simulated. The correlator parameters used are $\delta_{E-L}$=1.0, d=0.1, n=11. Both $F_p$=1 and $F_p$=5 are evaluated. A sampling rate of 25 MHz and a CNR of 50 dB-Hz are used. This CNR is chosen as a nominal value measured in a well-known real dataset from TEXBAT. On the left y-axis, the synthetic received signal post-correlation y is seen as the triangle 16, and the right y-axis denotes the $\hat{\beta}$ outputs (please note y-axis ranges). The x-axis shows the correlator tap outputs. The top graph of FIG. 6 shows a split of 0.3 and 0.4 chips near the spoofer code-phase location due to its coarse grid. The transversal dotted line 17 shows a threshold level of 30%, or −10.5 dB of the normalized authentic signal power. This means that a spoofed-over-authentic peak power level at less than −10.5 dB will remain undetected. The threshold level is calculated from the normalized power. The threshold will be discussed below in more detail. Furthermore, this result shows the peak-splitting phenomenon discussed above. Due to this, the peak detection at phase 0.3 for $F_p$=1 (top) is under the threshold line. The bottom graph of FIG. 6 shows the case for $F_p$=5 with the multi-LASSO technique, where the interleaved magnitude outputs of $\hat{\beta}_K$ are plotted with red bars, along with the maximized output $\hat{\beta}_{max}$ in yellow. Due to the higher-resolution in the grid, the simulated code-phase of 0.34 is clearly detected and afterwards translated to the correlator tap of phase 0.3, where this peak is now above the threshold level, at a value of 0.42 relative to the receiver power.

Monte-Carlo Simulation Setup

The model is assessed by generating synthetic complex-valued GPS-like signals with AWGN. Monte-Carlo simulations are used for a fixed CNR level assimilating nominal GPS conditions. The method of the present disclosure is evaluated on frequency-locked spoofing attacks, thus the carrier frequency for both authentic and spoofed peaks is neglected. Similarly, the spoofer phase $\theta_S$ is neglected. Table 1 shown in FIG. 7 lists the simulation parameters for signal generation, correlators' configuration, dictionary matrix sizes, and method for the next results.

A DER metric is used to account for detected peaks in the simulations. In terms of detection, the two peaks with the highest values in the sparse vector output are selected as peak candidates, i.e., authentic and spoofed. Authentic and spoofer peaks at known delays are generated as in Equation 18. If the proposed method is unable to detect the spoofer peak at the same delay, it is considered a detection error. For power levels, three levels are used in terms of the spoofed-over-authentic signal power in dB. For simulation scenarios, a worst-case scenario would be an authentic-over-spoofer signal power of 6 dB, and one msec integration length, where the spoofer is the lowest in power, thus hardest to detect with low CNR levels. For threshold level, a conservative 30% obtained heuristically is used. More details on the threshold are discussed below.

Simulation Results

Figure 8:
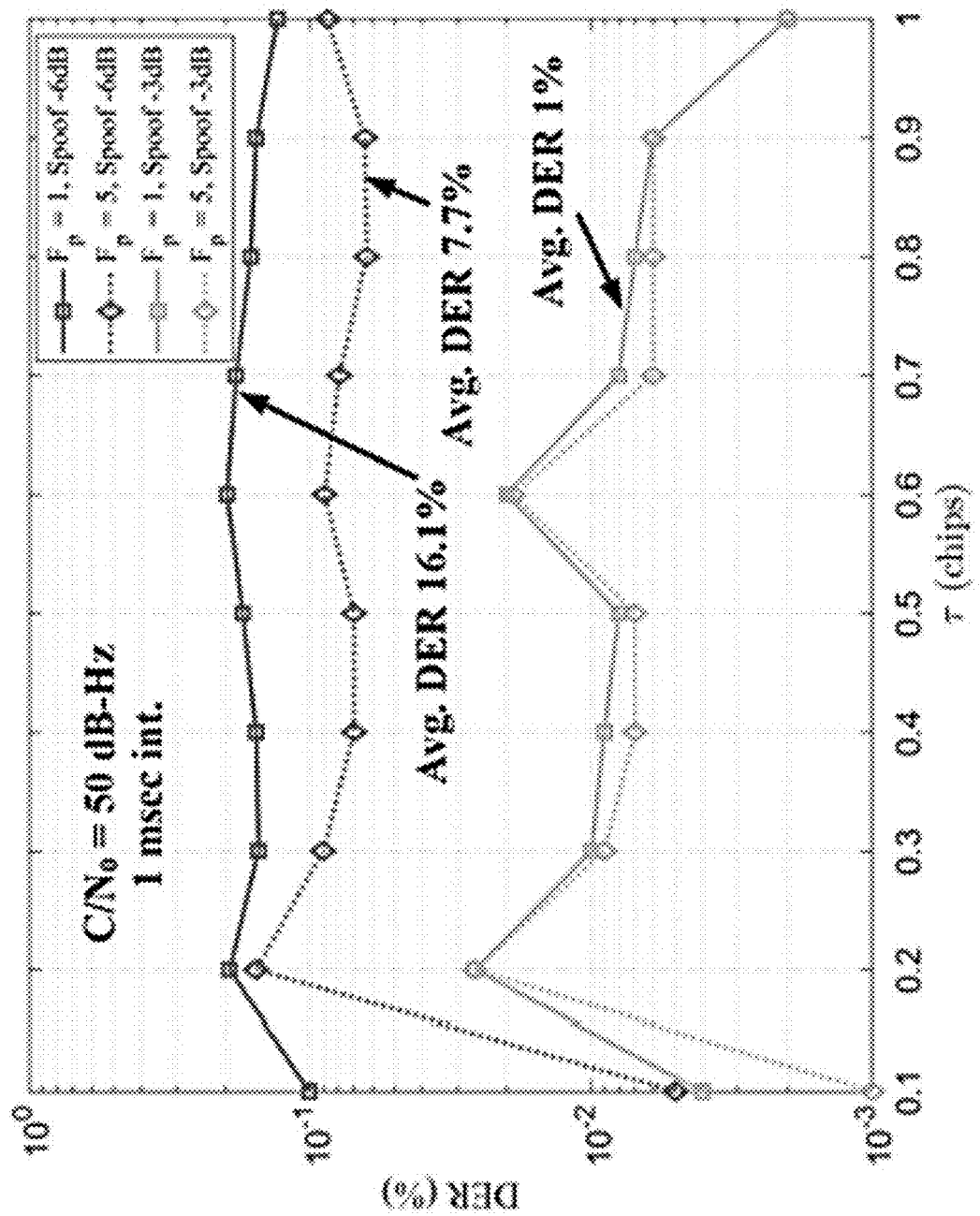
FIG. 8 depicts plots of simulation results for the DER vs code-phase $\tau_t$ for a simulated spoofer delay ranging from 0.1 to 1.0 chips in a granularity of $d_p$=0.1 chips and run 1000 Monte-Carlo simulations per delay, while the authentic peak is always at 0.0 chips.

FIG. 8 depicts plots of simulation results the DER vs code-phase $\tau_i$ for a simulated spoofer delay ranging from 0.1 to 1.0 chips in a granularity of $d_p$=0.1 chips and run 1000 Monte-Carlo simulations per delay, while the authentic peak is always at 0.0 chips. An integration length of 1-msec is used to highlight the gains of multi-LASSO over single-LASSO ($F_p$=1). For the worst-case scenario of authentic-over-spoofer power of 6 dB, the multi-LASSO $F_p$=5 technique is able to maintain a DER of 7.7% averaged over all taps, when compared to an average DER of 16.1% for $F_p$=1. This shows more than two-fold gain.

For authentic-over-spoofer power of 3 dB, the two techniques see an average DER of 1% and 0.9%, for single and multi-LASSO, respectively. At authentic-over-spoofer power of 0 dB, the DER was essentially zero for all delays. Overall, the average DER of the proposed techniques over all spoofer power levels and discrete delays is 5.7% and 2.9%, for $F_p$=1 and $F_p$=5, respectively.

Figure 9:
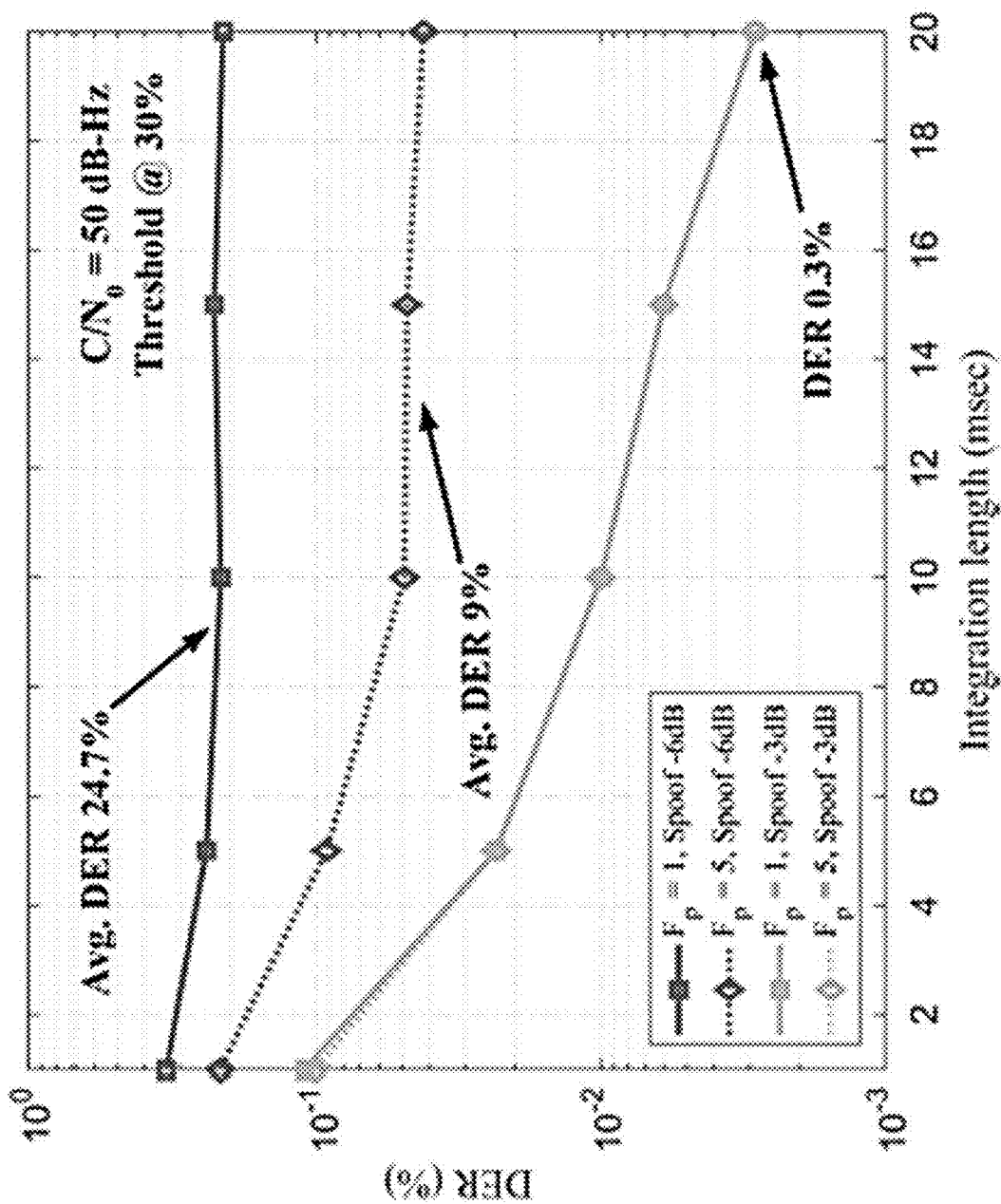
FIG. 9 shows simulation results DER vs. coherent integration lengths of 1, 5, 10, 15, and 20 msec.

Similar to a BER curve, the DER was compared against different integration lengths of the received signal. The higher the integration length, the better quality of the signal as the CNR is improved with 20 periods of the 1-msec navigation bit. FIG. 9 shows simulation results DER vs. coherent integration lengths of 1, 5, 10, 15, and 20 msec. For each coherent integration length and scenario, 1500 Monte-Carlo iterations were run in randomly placed spoofer peak on a grid with resolution of $d_p$=0.01 chips. The authentic peak was placed at tap 0.0. The heuristically obtained threshold of 30% was used. The major gain can be seen for the authentic-over-spoofer power of 6 dB when $F_p$=5 is used. An average gain of 15.7% DER is seen in such case, for all integration lengths. For the higher authentic-over-spoofer power scenario, i.e., 3 dB, 0.3% DER at 20 msec integration length is seen for both $F_p$=1 and $F_p$=5. Again, at authentic-over-spoofer power of 0 dB, the DER is essentially zero for all integration lengths.

Figure 10:
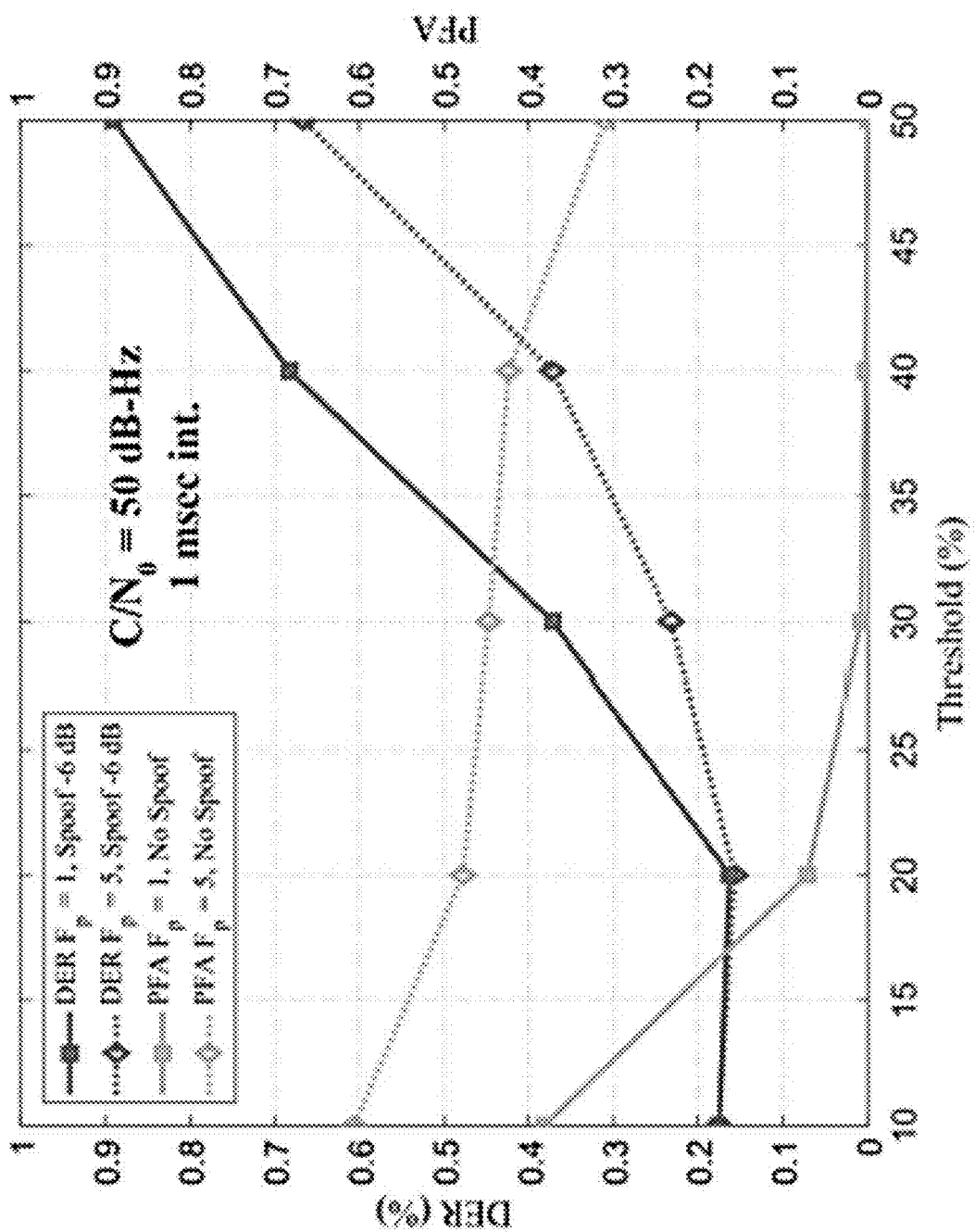
FIG. 10 shows simulation results DER vs threshold vs PFA for worst-case authentic-over-spoofer power of 6 dB and 1-msec integration length for threshold levels 10, 20, 30, 40, and 50 percent.

To evaluate the impact of the heuristically obtained threshold, the PFA is assessed. A single authentic peak with nominal noise levels is simulated as we modify the threshold levels from 10 percent to 50 percent. A false alarm event is defined when a spoofer peak is wrongly detected. The worst-case scenario with an authentic-over-spoofer power of 6 dB and 1 msec integration length is assessed to estimate the PFA and DER. FIG. 10 shows Simulation results DER vs threshold vs PFA for worst-case authentic-over-spoofer power of 6 dB and 1-msec integration length for threshold levels 10, 20, 30, 40, and 50 percent. Similarly to the results shown in FIG. 9, each threshold level was simulated with 1000 Monte-Carlo iterations and a randomly placed spoofer peak on a grid with resolution of $d_p$=0.01 chips. For the PFA results, only the authentic peak centered at tap 0.0 is simulated to assess false alarm detection peaks confused with noise (that is, no spoofer is present). The multi-LASSO technique shows overall better DER for several threshold levels at the cost of higher PFA. This is due to a higher sensitivity for detection.

The method of the present disclosure can be implemented as monitoring tools in stages to avoid a high rate of false alarms. One can use single-LASSO optimization for an initial detection in nominal conditions, and multi-LASSO can be used as a secondary stage afterwards, to detect the spoofer peak location with a higher granularity.

Test with a Real Dataset

Figure 11:
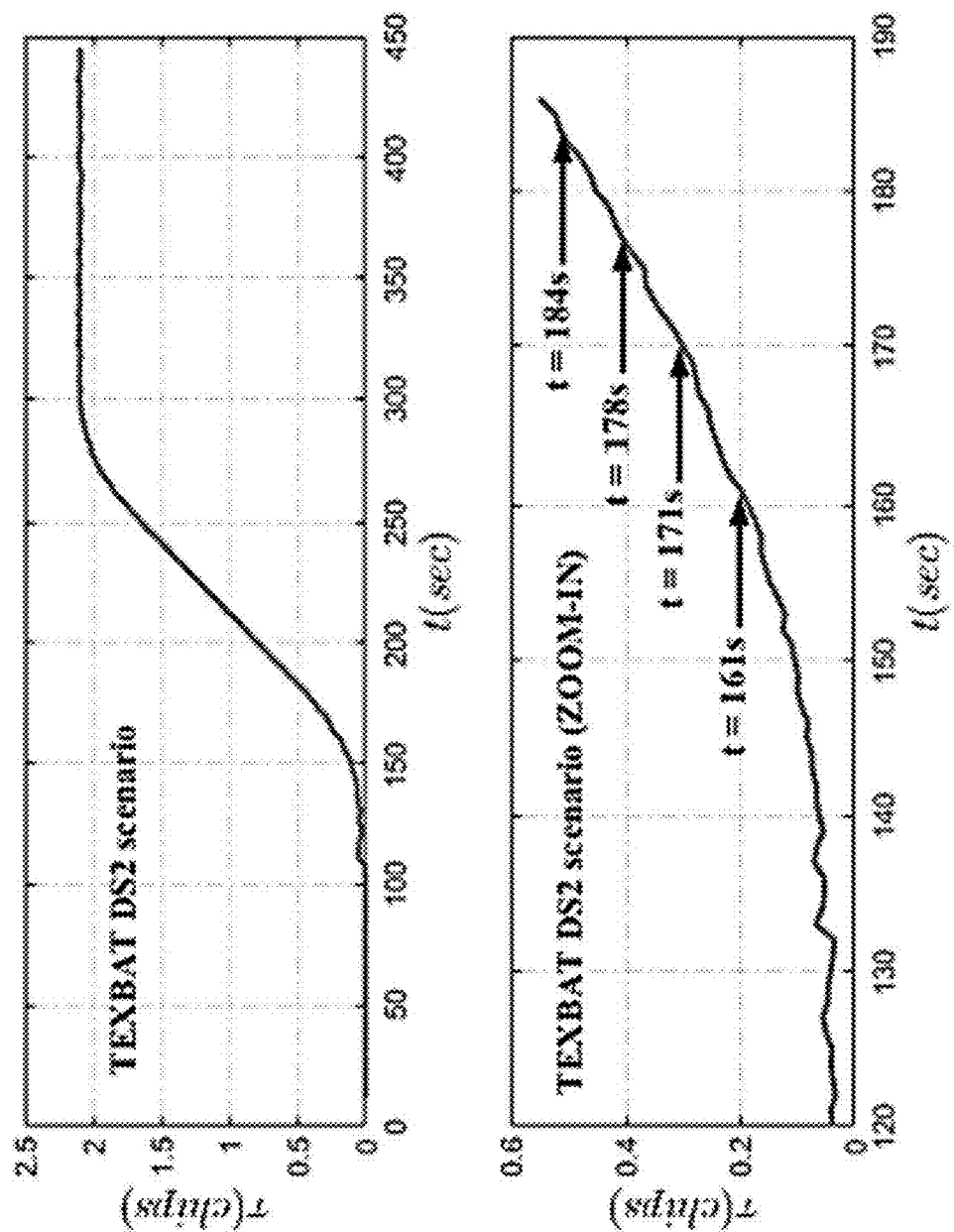
FIG. 11 is a graph depicting the TEXBAT DS2 spoofer attack difference on code-phase vs. authentic (top), zoomed-in around 0.5 code-phase (bottom), with markings at code-phases 0.2, 0.3, 0.4, and 0.5, respectively.

In this subsection, the model of the present disclosure is verified with a real dataset on a configurable SDR receiver. The real dataset is TEXBAT, a collection of spoofing scenarios simultaneously. For this scenario, the final code-phase drag-off is around 2.1 chips, which corresponds to approximately ~610 m bias on the receiver clock. The attack begins at t≅100 s and as it drags-off, it gradually overpowers the authentic signal by 10 dB. FIG. 11 is a graph depicting the TEXBAT DS2 spoofer attack difference on code-phase vs. authentic (top), zoomed-in around 0.5 code-phase (bottom), with markings at code-phases 0.2, 0.3, 0.4, and 0.5, respectively. FIG. 11 shows the attack in terms of code-phase difference, i.e., $\tau_S-\hat{\tau}$, for channel PRN23. This graph was generated using an SDR GPS receiver from the Software Communications and Navigation Systems (SCNS) Laboratory at the University of Texas at San Antonio (UTSA). The spoofer peak starts dragging-off noticeably at t=161 seconds by 0.2 code-phase (see FIG. 11 bottom for a zoomed-in version). Thus, snapshots of the received signal based on these attack estimates is used to find the spoofer peak at code-phase discrete values of 0.2, 0.3, 0.4, and 0.5, using the algorithm of the present disclosure.

The SDR receiver used for testing is able to operate in offline mode to process the dataset and extract software configurable correlator outputs. TEXBAT signals were recorded with high fidelity equipment from National Instruments at 25 MHz sampling rate, and 16-bit sample resolution in interleaved in-phase and quadrature format. We configured the receiver with said parameters. Since conventional GPS receivers operate on the 1.0 chip range, we configure the correlators slightly above this chip range for visual demonstration. We configure the correlators as follows: $\delta_{E-L}$=1.6, d=0.1, and n=17. The multi-LASSO technique was also performed with $F_p$=5. The correlator outputs from the SDR were collected and the optimization technique was applied on snapshots at t=161 s, t=171 s, t=178 s, and t=184 s, corresponding to estimated attack code-phases 0.2, 0.3, 0.4, and 0.5 chips, respectively (see FIG. 11, bottom). An integration length of 1 msec was used.

Figure 12:
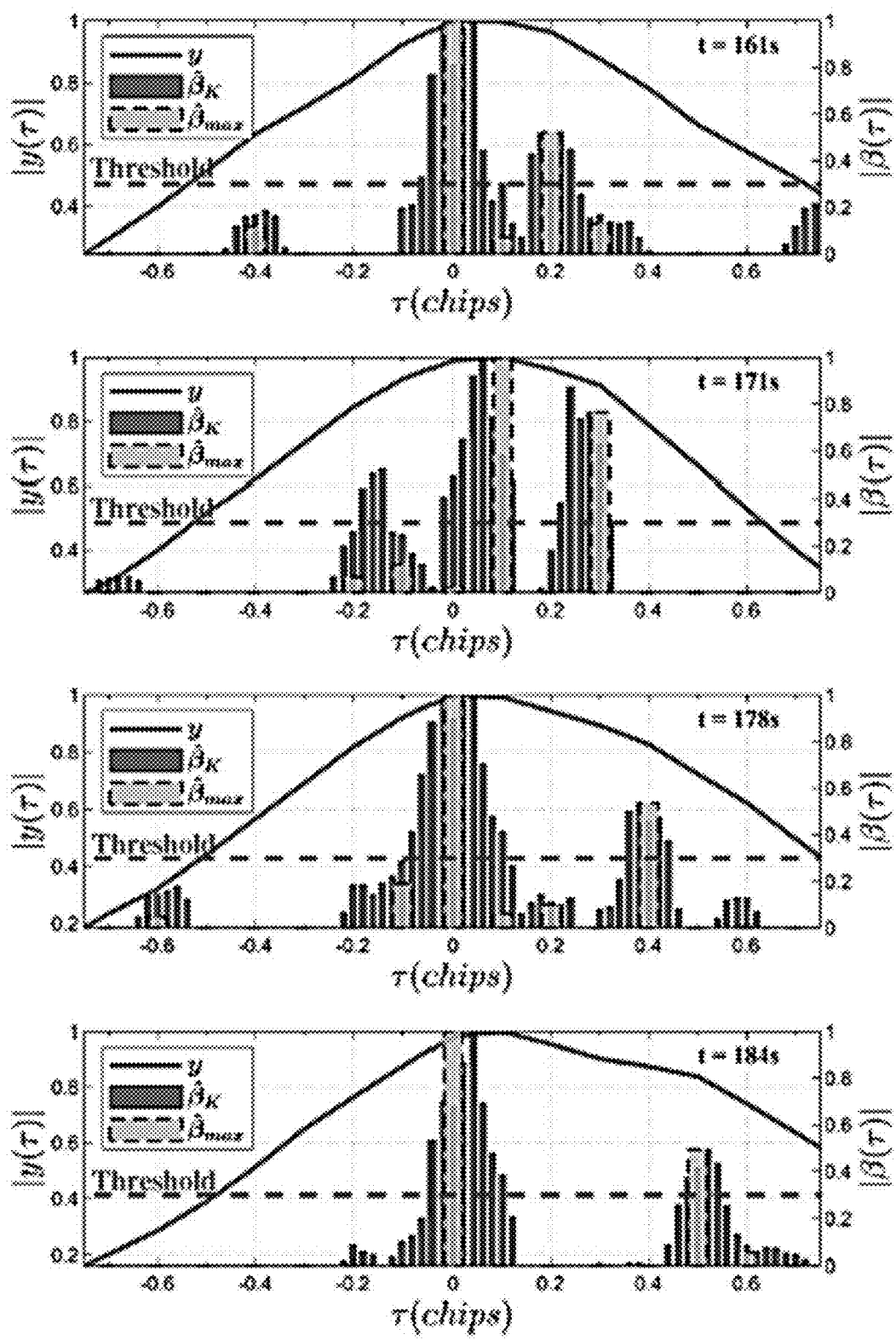
FIG. 12 shows plots showing the Multi-LASSO with p-factor of five on TEXBAT DS2 scenario for spoofer code-phases at 0.2, 0.3, 0.4, and 0.5 chips, respectively.

FIG. 12 are plots showing the Multi-LASSO with p-factor of five on TEXBAT DS2 scenario for spoofer code phases at 0.2, 0.3, 0.4, and 0.5 chips, respectively. The results shown in FIG. 12 for these scenarios show that the technique of the present disclosure is able to discern between both peaks at the estimated attack taps. A threshold of 30% was used as in the synthetic simulations.

Working with real data introduces interesting phenomena near the vicinity of the center peak. This can be seen as a DLL discriminator residual, since the main peak typically shows visible red bars (see FIG. 12 at t=171 s). In this time slot, the main peak is found at 0.06 code-phase and is mapped to tap 0.1. Additionally, the selector might find several peak candidates near the center as multipath. Even though the technique of the present disclosure is described herein in terms of its spoofer detection ability, it can potentially be used as a DLL discriminator and multipath detector.

Figure 13:
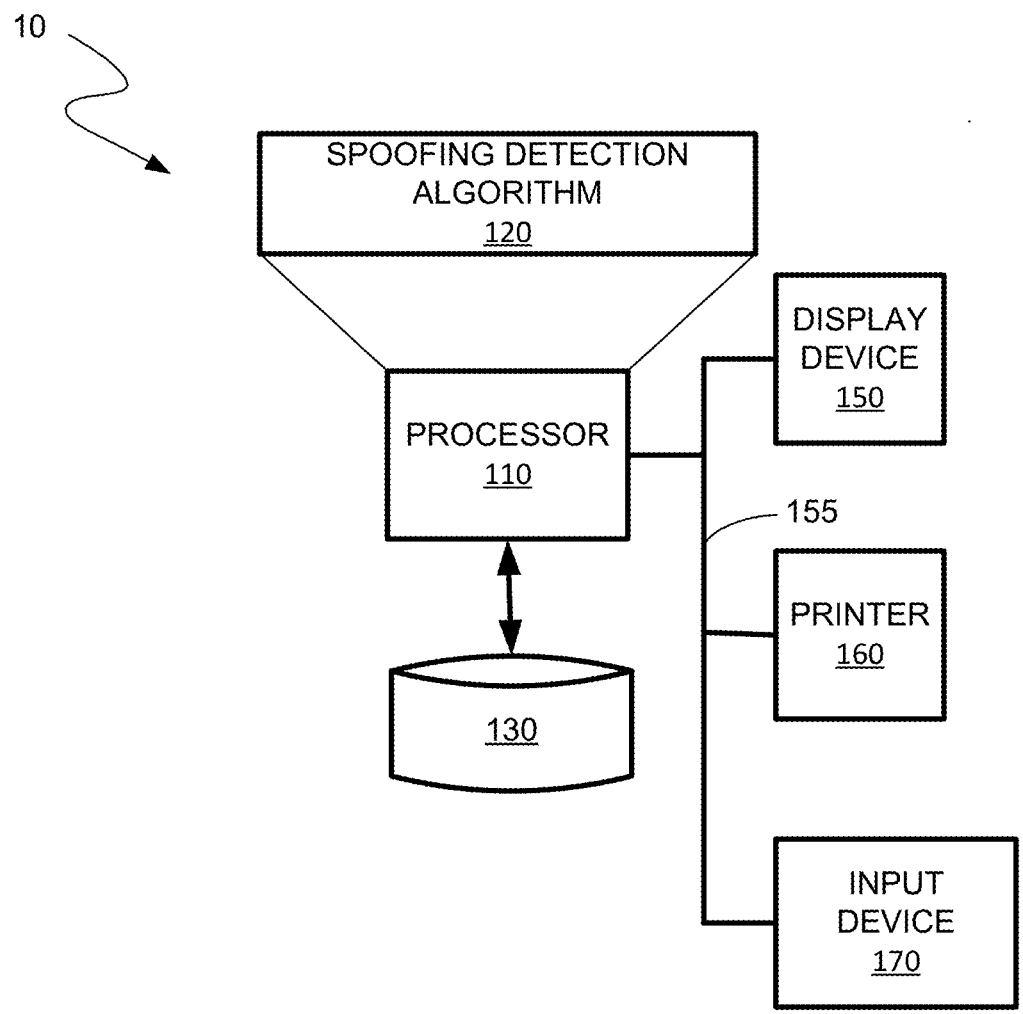
FIG. 13 is a block diagram of the system shown in FIG. 2 in accordance with a representative embodiment in which the system is implemented in software running on one or more processors.

FIG. 13 is a block diagram of the system 10 shown in FIG. 2 in accordance with a representative embodiment. In accordance with the embodiment shown in FIG. 13, the system 10 is implemented in software running on one or more processors 110. A memory device 130 in communication with the processor 110 stores computer code comprising the spoofing detection algorithm 120 and the aforementioned dictionary for performing the operations depicted in blocks 10a-10c of FIG. 2. The memory device 130 typically also stores the data that is output from the correlator bank 4 to block 10 and processed by block 10.

The memory device 130 can be any suitable non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments in logic embodied in hardware or software-configured mediums.

The system 10 can include, or be in communication with other devices, such as, for example, a display device 150, a printer 160 and an input device 170, such as a keyboard, a mouse, a scanner, a stylus pen/pad, etc. Such devices will typically be in communication with the processor 110 via a bus 155.

Figure 14:
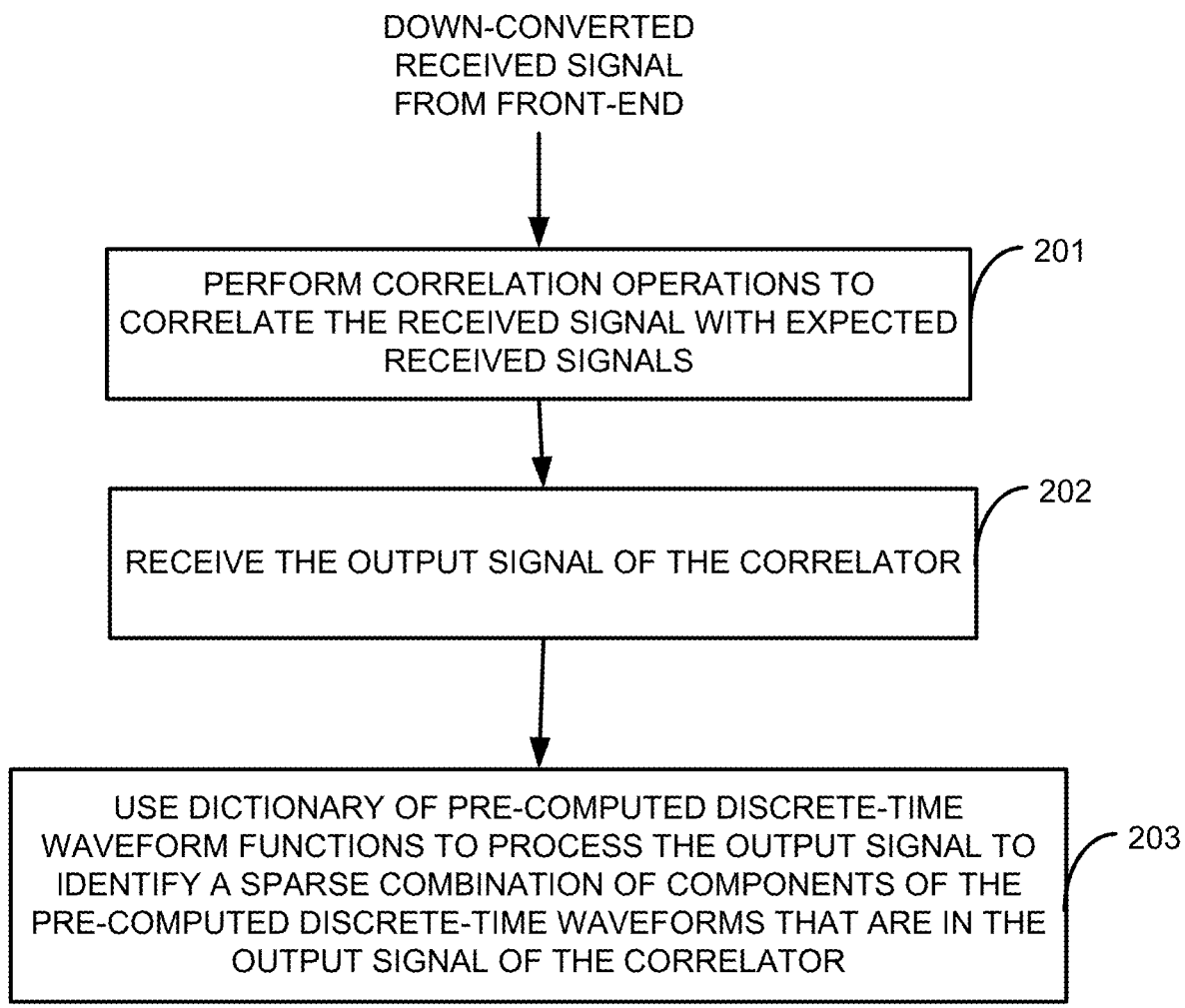
FIG. 14 is a flow diagram depicting the spoofing detection algorithm shown in FIG. 13 in accordance with a representative embodiment.

FIG. 14 is a flow diagram depicting the spoofing detection algorithm 120 shown in FIG. 13 in accordance with a representative embodiment. Block 201 represents the correlation process performed by the correlator bank 4 to produce the output signal that is input to block 10. Block 202 represents receiving an output signal of the correlator corresponding to the values of the output taps of the correlator. Block 203 represents using the dictionary of pre-computed discrete-time waveform functions to process the output signal of the correlator to identify a sparse combination of components of the pre-computed discrete-time waveforms in the output signal of the correlator. The identified sparse combination of components corresponds to at least an intended received GNSS signal and a spoofing signal contained in the output signal of the correlator, the a memory device, the dictionary of pre-computed discrete-time waveforms being stored in a memory device and read out by the processor.

In one embodiment, step 203 corresponds to the operations defined in Equations 9 and 10. In another embodiment, step 203 corresponds to the operations defined in Equations 9 and 11-13. In another embodiment, step 203 corresponds to the operations defined in Equations 9, 11 and 14-17. Although not specifically shown in FIG. 14, the method can also include the aforementioned thresholding operation to reduce or eliminate spoofing false alarms. It should be noted that many variations can be made to the method depicted in FIG. 14 by adding and/or reordering steps. It should also be noted that the operations represented by the flow diagram of FIG. 14 can be implemented in hardware, software or a combination thereof.

CONCLUSION

In the present disclosure, a spoofing detection and classification algorithm that can be based on the LASSO algorithm is disclosed to discriminate correlation peaks from a dictionary of triangle replicas. The method can be further extended to detect a higher-resolution grid tailored for spoofing attack delays that fall between two otherwise discrete points in the correlator tap grid. The multi-LASSO algorithm can be leveraged for its ability to detect spoofer peaks with a higher sensitivity without altering the receiver correlator configuration.

A peak sensitivity response method is explored to test the sensitivity of detection and define a detection bandwidth. Additionally, synthetic Monte-Carlo simulations are performed to evaluate several aspects of the proposed technique, including different integration lengths and thresholds, and relevant metrics such as DER and PFA are assessed. The method is able to maintain very low DER for several scenarios and for typical receiver configurations. The proposed method achieves 0.3% DER in nominal signal-to-noise ratio (SNR) conditions for an authentic-over-spoofer power of 3 dB. Additionally, in an example, an in-house SDR receiver from UTSA is used to collect correlation points from TEXBAT, a real dataset with a spoofing lift-off attack scenario. The spoofing detection algorithm is able to detect spoofer peaks at, for example, correlator taps 0.2, 0.3, 0.4, and 0.5 from the authentic peak, respectively.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while particular system arrangements are described herein and shown in the figures, a variety of other system configurations may be used. As will be understood by those skilled in the art in view of the description provided herein, many modifications may be made to the embodiments described herein while still achieving the goals of the invention, and all such modifications are within the scope of the invention.

What is claimed is:

1. A system for detecting a spoofing attack on a Global Navigation Satellite System (GNSS) receiver, the system comprising:
    a global navigation satellite system (GNSS) receiver;
    a memory device, the memory device having a dictionary of pre-computed discrete-time waveforms stored therein, the pre-computed discrete-time waveforms comprises a plurality of discrete-time triangle-like-shaped functions; and
    a processor configured to perform a spoofing detection algorithm that uses the dictionary of pre-computed discrete-time waveform functions to process an output signal component of a correlator bank of the GNSS receiver to identify a sparse combination of components of the pre-computed discrete-time waveforms in the output signal component of the correlator bank, the identified sparse combination of components corresponding to at least an intended received GNSS signal and a spoofing signal contained in the output signal component of the correlator bank, the sparse combination being identified by:
        performing a sparse optimization algorithm that selects components of a sparse vector of the dictionary for one of the plurality of discrete-time triangular-like-shaped functions that best matches a code-phase of the output signal component of the correlator bank.

2. The system of claim 1, wherein the output signal of the correlator bank comprises a discrete-time triangle-like-shaped function or a combination of discrete-time triangle-like-shaped functions.

3. The system of claim 1, wherein the sparse optimization algorithm comprises a Least Absolute Shrinkage and Selection Operator (LASSO) algorithm.

4. The system of claim 3, wherein the selected components of the sparse vector include in-phase and quadrature components.

5. The system of claim 4, wherein the sparse optimization algorithm comprises a multi-LASSO algorithm.

6. The system of claim 2, wherein the spoofing detection algorithm identifies at least first and second peaks of first and second discrete-time triangle-like-shaped functions, respectively, corresponding to the intended received GNSS signal and the spoofing signal, respectively, and wherein the spoofing detection algorithm includes a thresholding algorithm that applies a threshold value to magnitudes corresponding to the first and second peaks to reduce a possibility of false detection of the spoofing signal.

7. The system of claim 2, wherein the selected components of the sparse vector correspond at least to the intended received GNSS signal, the spoofing signal and a multipath (MP) signal, and wherein the spoofing detection algorithm distinguishes between the intended received GNSS signal, the spoofing signal and the MP signal.

8. The system of claim 2, wherein the sparse optimization algorithm finds an optimal selection according to an approximation error of a cost function to select the components of the sparse vector of the dictionary of pre-computed discrete-time triangular-like-shaped functions.

9. The system of claim 8, wherein the dictionary comprises sets of pre-computed triangle-like-shaped functions, each set corresponding to an expected triangle-like-shaped waveform of the output signal component of the correlator bank that are discrete-time shifted relative to the expected triangle-like-shaped waveform of the output signal component by predetermined discrete-time shift amounts.

10. A method for detecting a spoofing attack on a Global Navigation Satellite System (GNSS) receiver, the method comprising:
    performing, via a processor of a GNSS receiver, a spoofing detection algorithm that:
        receives an output signal component of a correlator bank of the GNSS receiver; and
        uses a dictionary of pre-computed discrete-time waveform functions to process the output signal component of the correlator bank to identify a sparse combination of components of the pre-computed discrete-time waveforms in the output signal component of the correlator bank, the identified sparse combination of components corresponding to at least an intended received GNSS signal and a spoofing signal contained in the output signal component of the correlator bank, the dictionary of pre-computed discrete-time waveforms being stored in a memory device of the GNSS receiver and read out by the processor, the pre-computed discrete-time waveforms comprising a plurality of discrete-time triangle-like-shaped functions, the sparse combination being identified by:

performing a sparse optimization algorithm that selects components of a sparse vector of the dictionary for one of the plurality of discrete-time triangular-like-shaped functions that best matches a code-phase of the output signal component of the correlator bank.

11. The method of claim 10, wherein the output signal component of the correlator bank comprises a discrete-time triangle-like-shaped function or a combination of discrete-time triangle-like-shaped functions.

12. The method of claim 10, wherein the sparse optimization algorithm comprises a Least Absolute Shrinkage and Selection Operator (LASSO) algorithm.

13. The method of claim 12, wherein the selected components of the sparse vector include in-phase and quadrature components.

14. The method of claim 13, wherein the sparse optimization algorithm comprises a multi-LASSO algorithm.

15. The method of claim 11, wherein the spoofing detection algorithm identifies at least first and second peaks of first and second discrete-time triangle-like-shaped functions, respectively, corresponding to the intended received GNSS signal and the spoofing signal, respectively, and wherein the spoofing detection algorithm includes a thresholding algorithm that applies a threshold value to magnitudes corresponding to the first and second peaks to reduce a possibility of false detection of the spoofing signal.

16. The method of claim 11, wherein the selected components of the sparse vector correspond at least to the intended received GNSS signal, the spoofing signal and a multipath (MP) signal, and wherein the spoofing detection algorithm distinguishes between the intended received GNSS signal, the spoofing signal and the MP signal.

17. The method of claim 11, wherein the sparse optimization algorithm finds an optimal selection according to an approximation error of a cost function to select the components of the sparse vector of the dictionary of pre-computed discrete-time triangular-like-shaped functions.

18. The method of claim 17, wherein the dictionary comprises sets of pre-computed triangle-like-shaped functions, each set corresponding to an expected triangle-like-shaped waveform of the output signal component of the correlator bank that are discrete-time shifted relative to the expected triangle-like-shaped waveform of the output signal component by predetermined discrete-time shift amounts.

19. A computer program embodied on a computer-readable medium, the program comprising computer code for execution by a processor to detect a spoofing attack on a Global Navigation Satellite System (GNSS) receiver, the computer program of the GNSS receiver comprising:

a first code portion that receives an output signal component of a correlator bank of the GNSS receiver; and a second code portion that uses a dictionary of pre-computed discrete-time waveform functions to process the output signal component of the correlator bank to identify a sparse combination of components of the pre-computed discrete-time waveforms in the output signal component of the correlator bank, the identified sparse combination of components corresponding to at least an intended received GNSS signal and a spoofing signal contained in the output signal component of the correlator bank, the dictionary of pre-computed discrete-time waveforms being stored in a memory device of the GNSS receiver and read out by the processor, the pre-computed discrete-time waveforms comprising a plurality of discrete-time triangle-like-shaped functions, the sparse combination being identified by:

performing a sparse optimization algorithm that selects components of a sparse vector of the dictionary for one of the plurality of discrete-time triangular-like-shaped functions that best matches a code-phase of the output signal component of the correlator bank.

* * * * *